United States Patent
Tsukahara et al.

(10) Patent No.: US 9,685,179 B2
(45) Date of Patent: Jun. 20, 2017

(54) TAPE DEVICE AND CONTROLLER THEREOF

(71) Applicant: FUJITSU LIMITED, Kawasaki-shi, Kanagawa (JP)

(72) Inventors: Ryota Tsukahara, Kawasaki (JP); Fumio Matsuo, Nagano (JP); Katsuo Enohara, Kawaguchi (JP); Takuya Kurihara, Nagano (JP); Takashi Murayama, Nagano (JP); Takaaki Yamato, Nagano (JP); Toshiaki Takeuchi, Nagano (JP); Nobuyuki Hirashima, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/133,362

(22) Filed: Apr. 20, 2016

(65) Prior Publication Data

US 2016/0322073 A1 Nov. 3, 2016

(30) Foreign Application Priority Data

May 1, 2015 (JP) .................................. 2015-093790

(51) Int. Cl.
*G11B 21/02* (2006.01)
*G11B 5/55* (2006.01)
*G11B 5/008* (2006.01)
*G11B 27/00* (2006.01)
*G11B 27/10* (2006.01)

(52) U.S. Cl.
CPC ........ *G11B 5/5508* (2013.01); *G11B 5/00817* (2013.01); *G11B 27/00* (2013.01); *G11B 27/107* (2013.01)

(58) Field of Classification Search
None
See application file for complete search history.

(56) References Cited

U.S. PATENT DOCUMENTS

| 6,204,987 | B1 * | 3/2001 | Dahlerud | G11B 15/08 360/72.3 |
| 7,046,466 | B1 * | 5/2006 | Molstad | G11B 5/584 360/48 |
| 7,372,657 | B2 * | 5/2008 | Gill | G11B 15/467 360/74.1 |
| 8,693,128 | B2 * | 4/2014 | Masuda | G11B 5/00813 360/53 |

FOREIGN PATENT DOCUMENTS

| JP | 8-45182 | 2/1996 |
| JP | 8-147654 | 6/1996 |

* cited by examiner

*Primary Examiner* — K. Wong
(74) *Attorney, Agent, or Firm* — Staas & Halsey LLP

(57) ABSTRACT

A tape device includes a tape drive, a storage unit, and a processor. The tape drive is configured to write plural data units in a magnetic tape formed with plural tracks. The storage unit is configured to store information indicating a reversal position set in a middle of the magnetic tape. The processor is configured to instruct the tape drive to start writing of a first data unit in the magnetic tape. The processor is configured to control the tape drive to continue the writing up to an end of the first data unit when a first write area crosses over the reversal position. The first data unit is written in the first write area. The processor is configured to control the tape drive to change a write destination from the first track to a second track after the first data unit is written and to reverse the write direction.

7 Claims, 17 Drawing Sheets

FIG.8

| MEDIUM SPECIFICATION TABLE | | | | 111a |
|---|---|---|---|---|
| GENERATION | DATA CAPACITY | NUMBER OF TRACKS | NUMBER OF WRAPS PER DATA BAND | |
| LTO1 | 100 GB | 384 | 12 | |
| LTO2 | 200 GB | 512 | 16 | |
| LTO3 | 400 GB | 704 | 11 | |
| LTO4 | 800 GB | 896 | 14 | |
| LTO5 | 1.5 TB | 1280 | 20 | |
| LTO6 | 2.5 TB | 2176 | 34 | |
| ... | ... | ... | ... | |

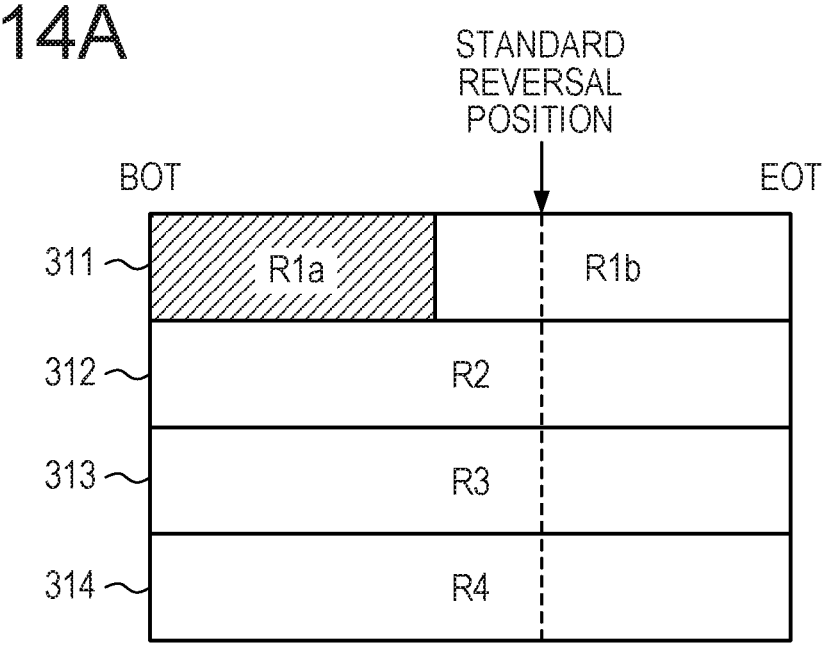
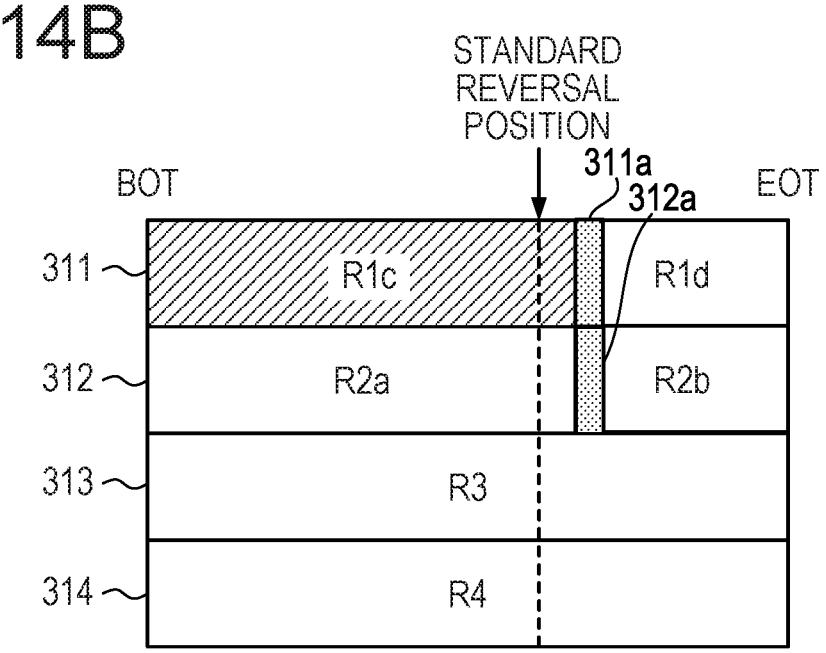

TAPE DEVICE AND CONTROLLER THEREOF

CROSS-REFERENCE TO RELATED APPLICATION

This application is based upon and claims the benefit of priority from the prior Japanese Patent Application No. 2015-093790, filed on May 1, 2015, the entire contents of which are incorporated herein by reference.

FIELD

The embodiments discussed herein are related to a tape device and a controller for controlling the tape device.

BACKGROUND

A magnetic tape has been known as an inexpensive mass storage medium. In some of a linear type magnetic tape, a plurality of tracks are formed, data is written in a certain track in a forward direction from the beginning of the track, and, when the writing is completed up to the end of the track, data is written in another track in a backward direction. As a standard of this type of magnetic tape, a Linear Tape-Open (LTO) Ultrium has been in wide use.

As an example of techniques related to writing in a magnetic tape, there has been proposed a technique for calculating a data length up to a reversal position on the basis of the entire amount of data to be written in the magnetic tape, writing the data up to the calculated reversal position in a forward direction, and then writing the remaining data in a backward direction.

A related technique is disclosed in, for example, Japanese Laid-Open Patent Publication No. 08-045182.

When the data is written up to the reversal position and then the remaining data is written in a backward direction as in the above-described technique, a direction reversal operation for backward reading is performed at the reversal position by a tape drive to read the written data. Such a direction reversal operation takes a relatively long time such as, for example, 2 seconds. Therefore, when a direction reversal operation occurs in the middle of reading data from the magnetic tape, there is a problem of taking a relatively long time to read the data.

SUMMARY

According to an aspect of the present invention, provided is a tape device including a tape drive, a storage unit, and a processor. The tape drive is configured to write plural data units in a magnetic tape formed with plural tracks. Each of the plural tracks has a write direction which is a forward direction or a backward direction. The storage unit is configured to store therein information indicating a reversal position set in a middle of the magnetic tape. The reversal position indicates a position at which the write direction is to be reversed in the magnetic tape. The processor is configured to instruct the tape drive to start writing of a first data unit of the plural data units in the magnetic tape. The processor is configured to control the tape drive to continue the writing of the first data unit up to an end of the first data unit when a first write area crosses over the reversal position. The first write area is an area of a first track of the plural tracks. The first data unit is written in the first write area. The first track has the forward direction. The processor is configured to control the tape drive to change a write destination from the first track to a second track of the plural tracks after the first data unit is written in the first write area and to reverse the write direction. The write destination is a track in which data is written.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a medium specification table;

FIGS. 14A and 14B are diagrams illustrating exemplary processing of determining a write direction and a write destination WRAP;

DESCRIPTION OF EMBODIMENTS

Hereinafter, embodiments will be described with reference to the drawings.

First Embodiment

Figure 1:
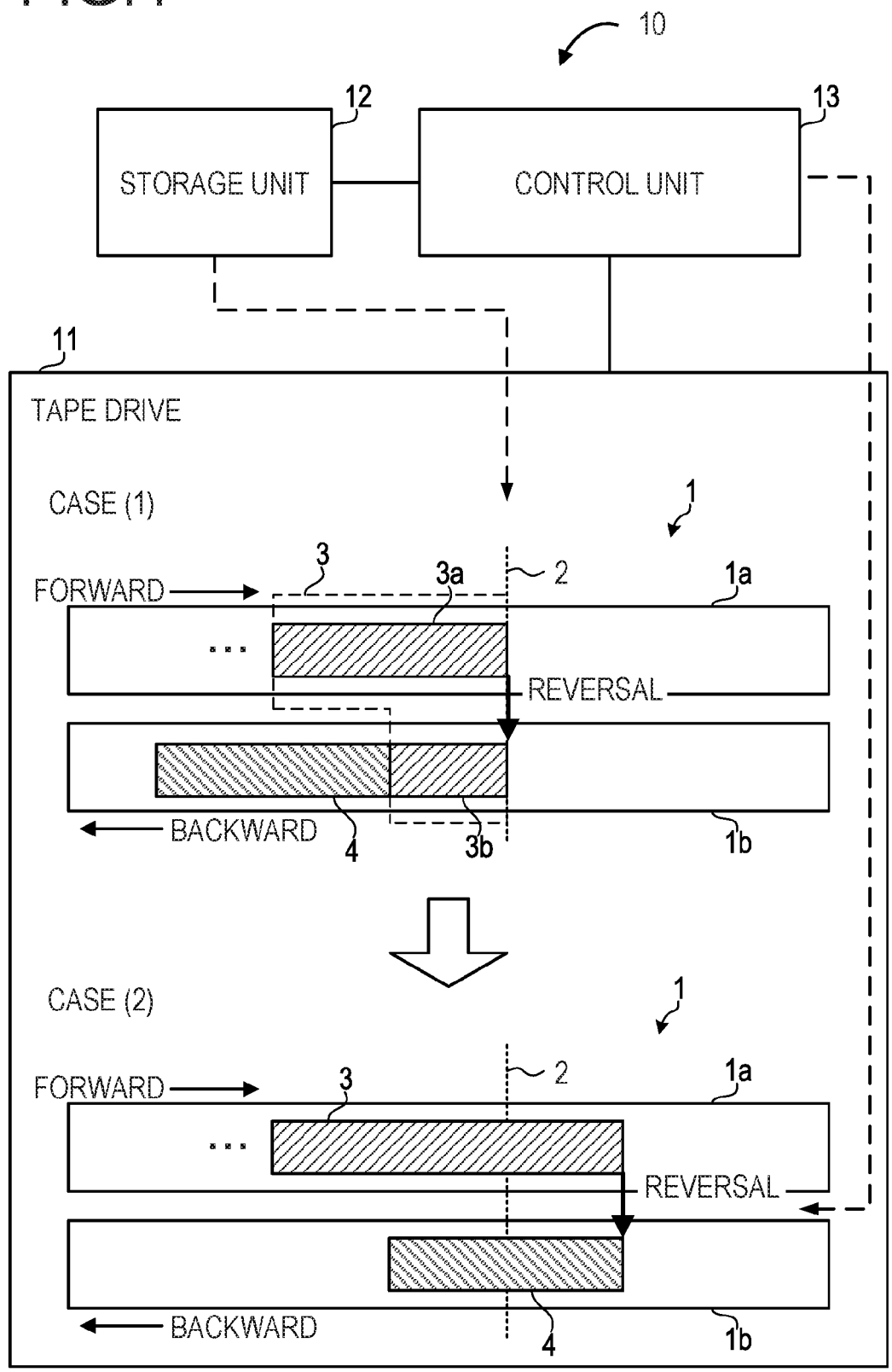
FIG. 1 is a diagram illustrating a tape device according to a first embodiment.

FIG. 1 is a diagram illustrating a tape device according to a first embodiment. A tape device 10 includes a tape drive 11, a storage unit 12, and a control unit 13.

A magnetic tape 1 is stored in the tape drive 11. The tape drive 11 may at least write data in the stored magnetic tape 1. A plurality of tracks are formed in the magnetic tape 1. The tape drive 11 performs data writing while reciprocating on the magnetic tape in such a manner that data is written in one of the plurality of tracks in a forward direction, data is written in the subsequent track in a backward direction, and data is written in the next track in a forward direction, and so on. In the first embodiment, the term "track" may also include a set of tracks in which data is simultaneously written and read.

The storage unit 12 may be a volatile storage device such as, for example, a random access memory (RAM) or a nonvolatile storage device such as, for example, a hard disk drive (HDD) or a flash memory. The storage unit 12 stores therein information indicating a reversal position 2 of a write direction, which is set in the middle of the magnetic tape 1. The information indicating the reversal position 2 may be calculated by the control unit 13 and stored in the storage unit 12.

The control unit 13 is, for example, a processor. The processor may include, for example, a central processing unit (CPU), a digital signal processor (DSP), an application specific integrated circuit (ASIC), a field programming gate array (FPGA). The term "processor" used herein may include a set of processors (multiprocessor).

The control unit 13 controls the tape drive 11 to write plural data units in the magnetic tape 1. For example, in response to a write request to write the plural data units received from a host device (not illustrated), the control unit 13 instructs the tape drive 11 to write the plural data units in the magnetic tape 1. Each of the "plural data units" is a predetermined data unit such as, for example, a file or a volume. For example, the control unit 13 instructs the tape drive 11 to write the plural data units, in units of segmented data derived by dividing each data unit, not in the predetermined data units. The control unit 13 may receive a data write request from the host device in units of segmented data.

The control unit 13 instructs the tape drive 11 to start writing of one of the plural data units (referred to as "first data unit") in a first track, in which data is written in a forward direction, among the plurality of tracks on the magnetic tape 1. When a write area of the first data unit in the first track crosses over the reversal position 2, the control unit 13 instructs the tape drive 11 to continue the data writing up to the end of the first data unit. Then, the control unit 13 transmits a direction reversal instruction to the tape drive 11 to change the write destination from the first track to a second track among the plurality of tracks, and to reverse the write direction at the end of the first data unit.

Accordingly, such a situation may be prevented that the read direction is reversed in the middle of reading the first data unit. As a result, the reading speed of the first data unit may be increased.

Hereinafter, as examples of processing of writing data units 3 and 4 among the plural data units in the magnetic tape 1, Case (1) and Case (2) illustrated in FIG. 1 will be described. Case (1) is provided as a comparative example and Case (2) is provided as an example of processing according to the first embodiment. It is assumed that in Case (1) and Case (2) writing of the data unit 3 begins from a track is in which data is written in a forward direction, and a write position reaches the reversal position 2 in the middle of writing the data unit 3. It is also assumed that Case (1) and Case (2) are both controlled by the control unit 13.

In Case (1), the control unit 13 instructs the tape drive 11 to start writing of the data unit 3 and outputs a direction reversal instruction to the tape drive 11 when the write position reaches the reversal position 2 in the middle of writing the data unit 3. Accordingly, data in a data area 3a ranging from the head of the data unit 3 to the reversal position 2 is written in the track 1a, and data in the remaining data area 3b of the data unit 3 is written in a track 1b next to the track is in a reverse direction from the reversal position 2. When the control unit 13 instructs the tape drive 11 to write the data unit 4, the tape drive 11 writes the data unit 4 subsequently to the data area 3b in the reverse direction in the track 1b.

The reversal position 2 is set, for example, in such a manner that an amount of positioning of a magnetic head is reduced when the data written in the magnetic tape 1 are read. That is, instead of writing data in the entire tracks from the head track of the magnetic tape 1, a write area in each track is restricted to an area from the physical head of the magnetic tape 1 to the reversal position 2. Accordingly, when the data written in the magnetic tape 1 are read, a range in which the magnetic head is positioned is limited to the reversal position 2, thereby shortening a time taken for the positioning. As a result, data read performance may be improved. Such write control is effective in writing data with a limited capacity smaller than the overall capacity of the magnetic tape 1.

However, in Case (1), the data unit 3 is written over the tracks 1a and 1b. For such writing, the read direction is always reversed in the middle of reading the data unit 3. Since such a reversal operation of the read direction takes a time, it takes a long time to read the entire data unit 3, which results in deterioration of read performance.

As a measure against this problem, according to the first embodiment, the control such as Case (2) is performed. When it is determined that the write area of the data unit 3 in the track is crosses over the reversal position 2, the control unit 13 instructs the tape drive 11 to continue the data writing up to the end of the data unit 3. Then, at a position at which the data writing up to the end of the data unit 3 has been completed, the control unit 13 transmits a direction reversal instruction to the tape drive 11. Upon receiving the direction reversal instruction, the tape drive 11 changes the write destination from the track is to the track 1b and reverses the write direction at the end of the data unit 3. For example, when the control unit 13 instructs the tape drive 11 to write the next data unit 4, the tape drive 11 writes the data unit 4 in the track 1b in a backward direction starting from the position at which the write direction is inversed.

With such control, since the entire data unit 3 is written in one track 1a, the read direction is not reversed in the middle of reading the data unit 3. Accordingly, the read time of the data unit 3 may be shortened as compared to Case (1). In Case (2), since the end of the data unit 3 crosses over the reversal position 2, the amount of positioning of the magnetic head at the time of reading in the tracks 1a and 1b increases over that in Case (1). However, in spite of the increase in the amount of positioning, the absence of direction reversal during data reading has great contribution to shortening the data read time of reading a data unit. Therefore, according to the first embodiment, read performance of data written in the magnetic tape 1 may be improved.

Second Embodiment

Figure 2:
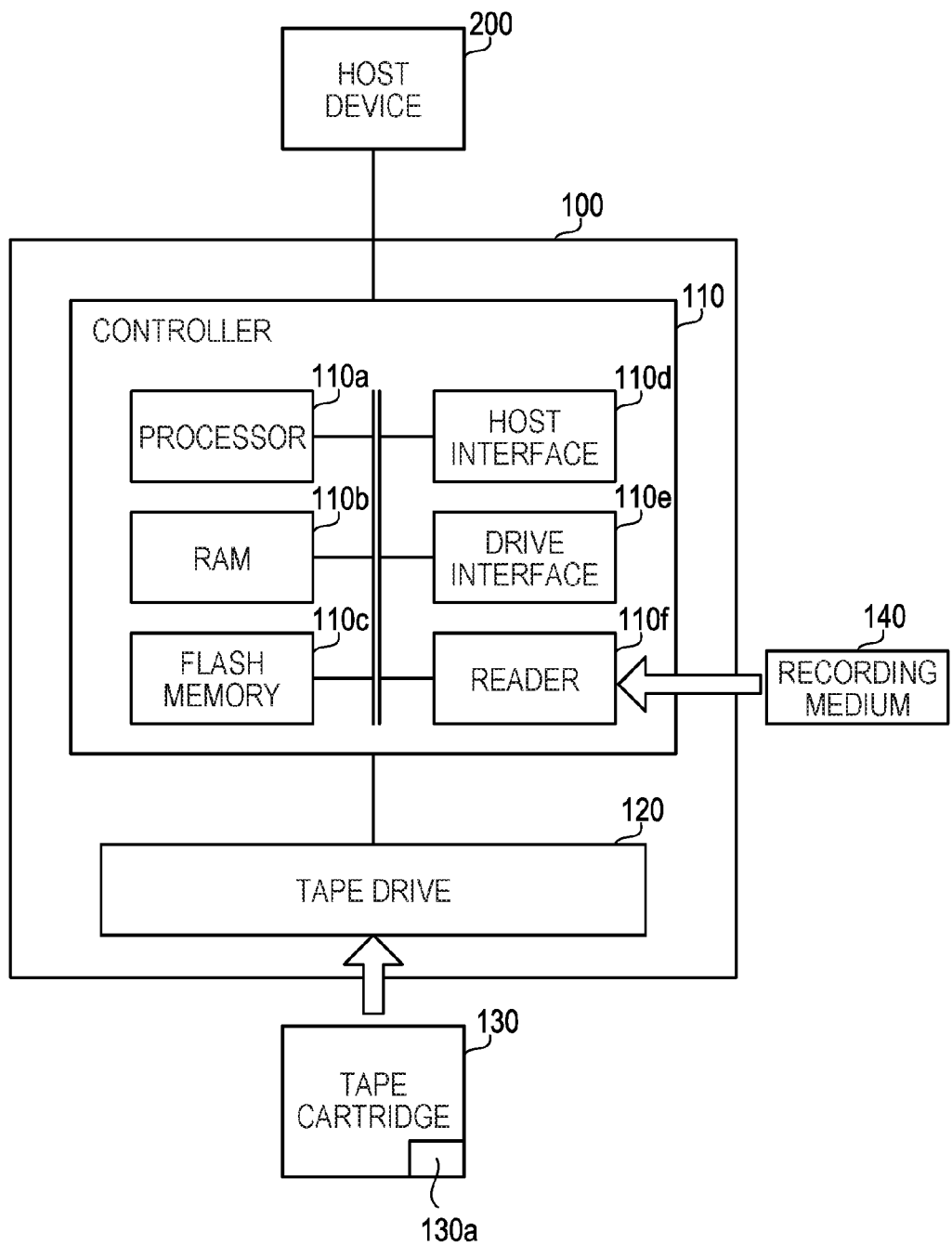
FIG. 2 is a diagram illustrating an exemplary hardware configuration of a tape device according to a second embodiment.

FIG. 2 is a diagram illustrating an exemplary hardware configuration of a tape device according to a second embodiment. A tape device 100 includes a controller 110 and a tape drive 120. The tape device 100 may include a plurality of tape drives.

The controller 110 controls, for example, the data access to a tape cartridge 130 stored in the tape drive 120 in response to a request received from a host device 200, and operations of hardware modules in the tape device 100.

The tape device 100 is an example of the tape device 10 of FIG. 1, the controller 110 is an example of a device including the storage unit 12 and the control unit 13 of FIG. 1, and the tape drive 120 is an example of the tape drive 11 of FIG. 1.

The controller 110 includes a processor 110a, a RAM 110b, a flash memory 110c, a host interface 110d, a drive interface 110e, and a reader 110f.

The processor 110a controls the overall operation of the controller 110. The processor 110a is, for example, a CPU, a DSP, an ASIC, or an FPGA. The processor 110a may be a multiprocessor. The processor 110a may be a combination of two or more of the CPU, the DSP, the ASIC, and the FPGA.

The RAM 110b is a main memory of the tape device 100. The RAM 110b temporarily stores therein at least a portion of an operating system (OS) program and an application program to be executed by the processor 110a. The RAM 110b also stores therein various data to be used in processing performed by the processor 110a.

The flash memory 110c is an auxiliary memory of the tape device 100. The application program and various data are stored in the flash memory 110c.

The host interface 110d is an interface for communication with the host device 200. The drive interface 110e is an interface for communication with the tape drive 120.

The reader 110f is a device for reading a program and data written in a portable recording medium 140. An example of the recording medium 140 may include a magnetic disk such as a flexible disk (FD) or an HDD, an optical disk such as a compact disc (CD) or a digital versatile disc (DVD), a magneto-optical (MO) disk, or the like. Another example of the recording medium 140 may include a nonvolatile semiconductor memory such as a flash memory card. For example, in accordance with an instruction from the processor 110, the reader 110f stores a program or data read from the recording medium 140 in the RAM 110b or the flash memory 110c.

The tape cartridge 130 in which a magnetic tape is stored is inserted in and removed from the tape drive 120. The tape cartridge 130 includes a cartridge memory 130a. A variety of information related to the tape cartridge 130 is stored in the cartridge memory 130a. The tape drive 120 mounts the cartridge memory 130a and performs writing of data in the magnetic tape in the mounted tape cartridge 130 and reading of data from the magnetic tape under the control of the controller 110. In addition, the tape drive 120 may perform writing of data in the cartridge memory 130a of the mounted tape cartridge 130 and reading of data from the cartridge memory 130a. For example, when unmount of the tape cartridge 130 is required, the tape drive 120 unmounts the tape cartridge 130 after writing a residual capacity of the magnetic tape in the cartridge memory 130a.

Figure 3:
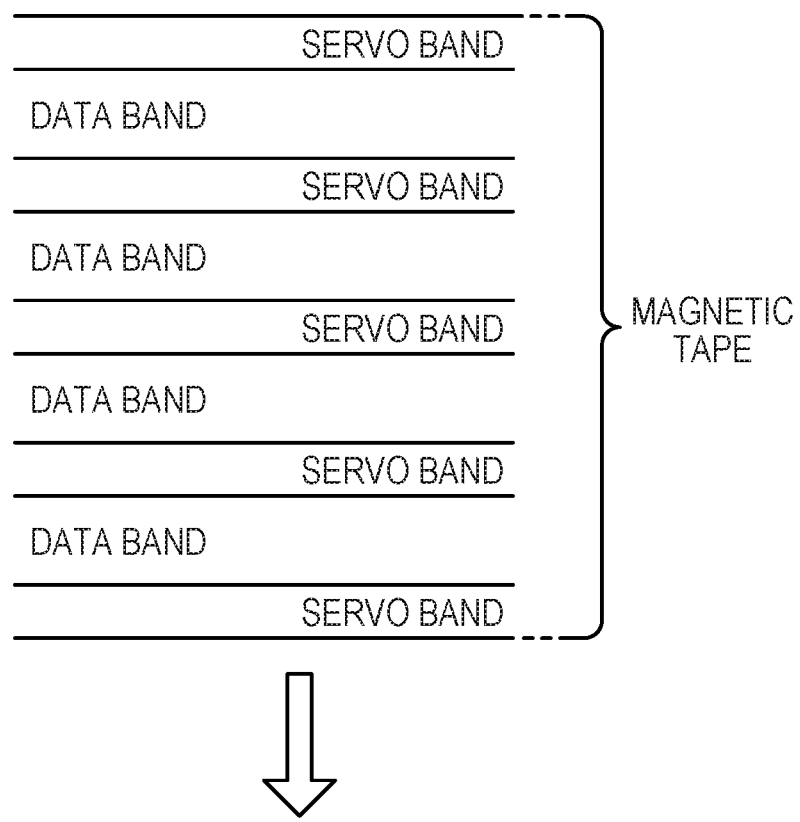
FIG. 3 is a diagram illustrating an example of a magnetic tape.

FIG. 3 is a diagram illustrating an example of a magnetic tape. In the present embodiment, as an example, a magnetic tape of an LTO Ultrium standard is used. The magnetic tape of an LTO Ultrium standard has five servo bands and four data bands. Each of the data bands has a plurality of tracks. For LTO Ultrium 6, the magnetic tape has 2176 tracks in total, with 544 tracks in each data band.

In the LTO Ultrium standard, reading/writing is performed in both of forward and backward directions. In addition, in the LTO Ultrium standard, a plurality of tracks in a data band are simultaneously read/written. For example, for LTO Ultrium 6, 16 tracks are simultaneously written in one data band, and, by reciprocating the magnetic head 17 times, 544 (16×2×17) tracks in total are written in one data band. Here, a group of tracks which are simultaneously read/written is referred to as a "WRAP". For LTO Ultrium 6, one WRAP includes 16 tracks.

Figure 4:
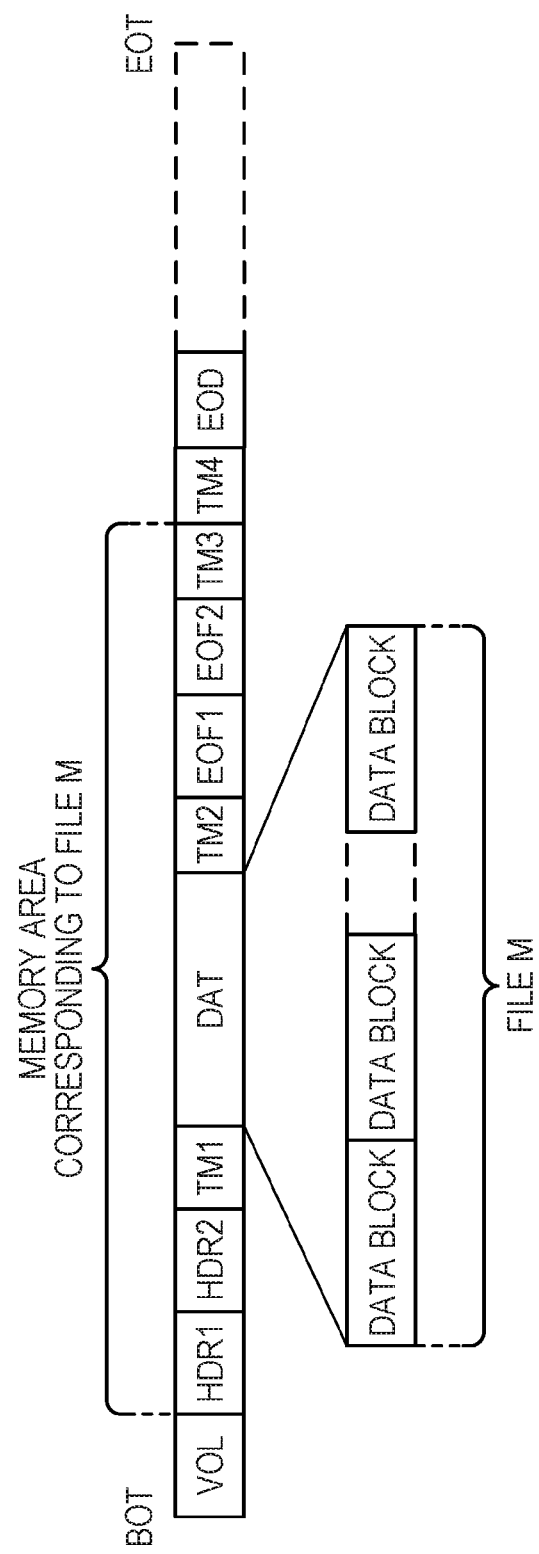
FIG. 4 is a diagram illustrating a data format of a magnetic tape.

FIG. 4 is a diagram illustrating a data format of a magnetic tape. FIG. 4 illustrates a data format in the entire memory area of the magnetic tape. In the drawing, BOT (beginning of tape) refers to the beginning of the magnetic tape, and EOT (end of tape) refers to the end of the magnetic tape. In actuality, a label indicating BOT is marked at a position of the side of the beginning of the magnetic tape, and a label indicating EOT is marked at a position of the side of the end of the magnetic tape, although these labels are not illustrated in FIG. 4.

VOL (volume) is marked at the head of the magnetic tape. VOL is a label in which information serving as a header is recorded. The header indicates, for example, what kind of information is registered in the magnetic tape. FIG. 4 illustrates an example in which a file M is attached after VOL. HDR(header)1, HDR2, and TM (tape mark) are written before DAT (Data) which is an actual data memory area of the file M. For sake of understandability, it is assumed that TM written after HDR2 is denoted by TM1. In addition, TM, EOF(end of file)1, EOF2, and TM are written after DAT. For sake of understandability, it is assumed that TM written after DAT is denoted by TM2 and TM written after EOF2 is denoted by TM3.

HDR1 and HDR2 are labels indicating headers of a file. TM1 is a marker indicating the beginning of actual data. The actual data of the file M is divided into data blocks of a predetermined size. TM2 is a marker indicating the end of the actual data. EOF1 and EOF2 are labels indicating the end of the file. TM3 is a marker indicating the end of the file. That is, an area from HDR1 to TM3 is a memory area corresponding to one file M.

When the writing is terminated without another file written after the file M, TM and EOD (end of data) are written after the memory area corresponding to the file M. For sake of understandability, it is assumed that TM written after the memory area corresponding to the file M is denoted by TM4. TM4 is a marker indicating the end of an area in which data is stored. EOD is a label indicating the end of the area in which data is stored.

Each of the labels BOT, VOL, HDR1, HDR1, HDR2, EOF1, and EOF2 is constructed by 80 bytes. Each of TM1, TM2, TM3, and TM4, has the same capacity of less than 10 bytes.

Figure 5:
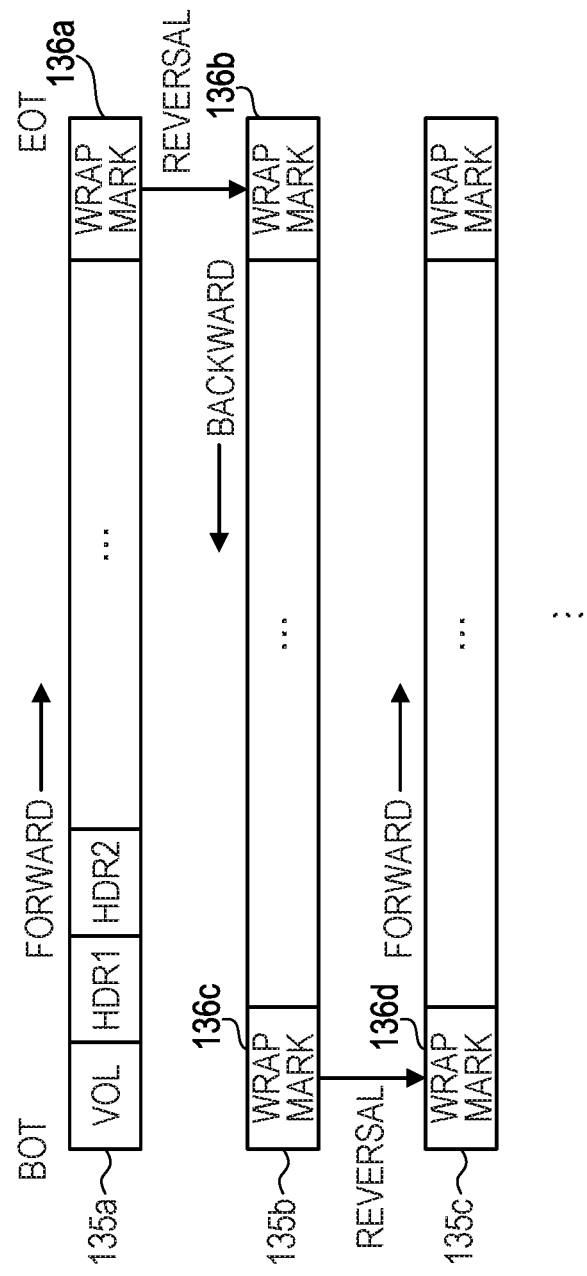
FIG. 5 is a diagram illustrating writing/reading of data in units of WRAPs.

FIG. 5 is a diagram illustrating writing/reading of data in units of WRAPs. Although not illustrated, a label indicating BOT is already written in the beginning of each WRAP, and a label indicating EOT is already written in the end of each WRAP. The terms "beginning" and "end" used herein refer to physical beginning and end of the magnetic tape, respectively, irrespective of the write/read directions.

In the LTO Ultrium standard, writing/reading is performed in both of the forward direction from BOT to EOT and the backward direction from EOT to BOT. Accordingly, WRAP includes "forward WRAP" in which writing/reading is performed in a forward direction and "backward WRAP" in which writing/reading is performed in a backward direction. In the example of FIG. 5, a WRAP 135a is a head and forward WRAP. A WRAP 135b is a second and backward WRAP. A WRAP 135c is a third and forward WRAP. That is, from the head, odd-numbered WRAPs are forward WRAPs, and even-numbered WRAPs are backward WRAPs.

Hereinafter, the beginning and the end of a WRAP in the write/read direction are referred to as a "WRAP beginning"

and a "WRAP end", respectively, which are distinguished from the beginning and the end indicated by BOT and EOT.

A marker called a WRAP mark indicating a position at which the read direction is reversed is marked in a WRAP. For example, in FIG. 5, it is assumed that the tape drive 120 performs forward data writing for the WRAP 135a. When a write position reaches a position of a predetermined length from EOT, the tape drive 120 writes a WRAP mark 136a in the WRAP 135a and reverses the write direction. The tape drive 120 writes a WRAP mark 136b in the WRAP 135b at an identical position as the WRAP mark 136a and then performs backward data writing for the WRAP 135b. When the write position reaches a position of a predetermined length from BOT, the tape drive 120 writes a WRAP mark 136c in the WRAP 135b and reverses the write direction. The tape drive 120 writes a WRAP mark 136d in the WRAP 135c at an identical position as the WRAP mark 136c and then performs forward data writing for the WRAP 135c.

The following operations are performed when data is read. For example, in FIG. 5, it is assumed that the tape drive 120 performs forward data reading from the WRAP 135a. Upon detecting the WRAP mark 136a, the tape drive 120 reverses the read direction and performs backward data reading from the WRAP 135b starting from the position of the WRAP mark 136b. Then, upon detecting the WRAP mark 136c, the tape drive 120 reverses the read direction and performs forward data reading from the WRAP 135c starting from the position of the WRAP mark 136d.

In some cases, the reversal of the write/read direction on a WRAP may be referred to as "WRAP reversal". As described above, in the read processing, the WRAP reversal is performed when a WRAP mark is detected.

As an example of a write mode of a magnetic tape, there are two modes, that is, a 128 track mode and a 36 track mode. The 128 track mode is a mode which has no limit in the number of writable data blocks and in which data is written in the magnetic tape in its entirety. The 36 track mode is a mode which has a limit in the number of writable data blocks. For example, the number of writable data blocks is a maximum of 4,000,000. This mode aims at providing the compatibility of a data format with a different standard of a magnetic tape such as a Cartridge Magnetic Tape (CMT).

In a case where writing is performed for a magnetic tape of the LTO Ultrium standard, the maximum amount of data allowed to be written in the 36 track mode is smaller than the maximum amount of data allowed to be written in the magnetic tape. Therefore, even when the maximum amount of data allowed to be written in the 36 track mode is written, an unused area is left in some WRAPs.

Figure 6:
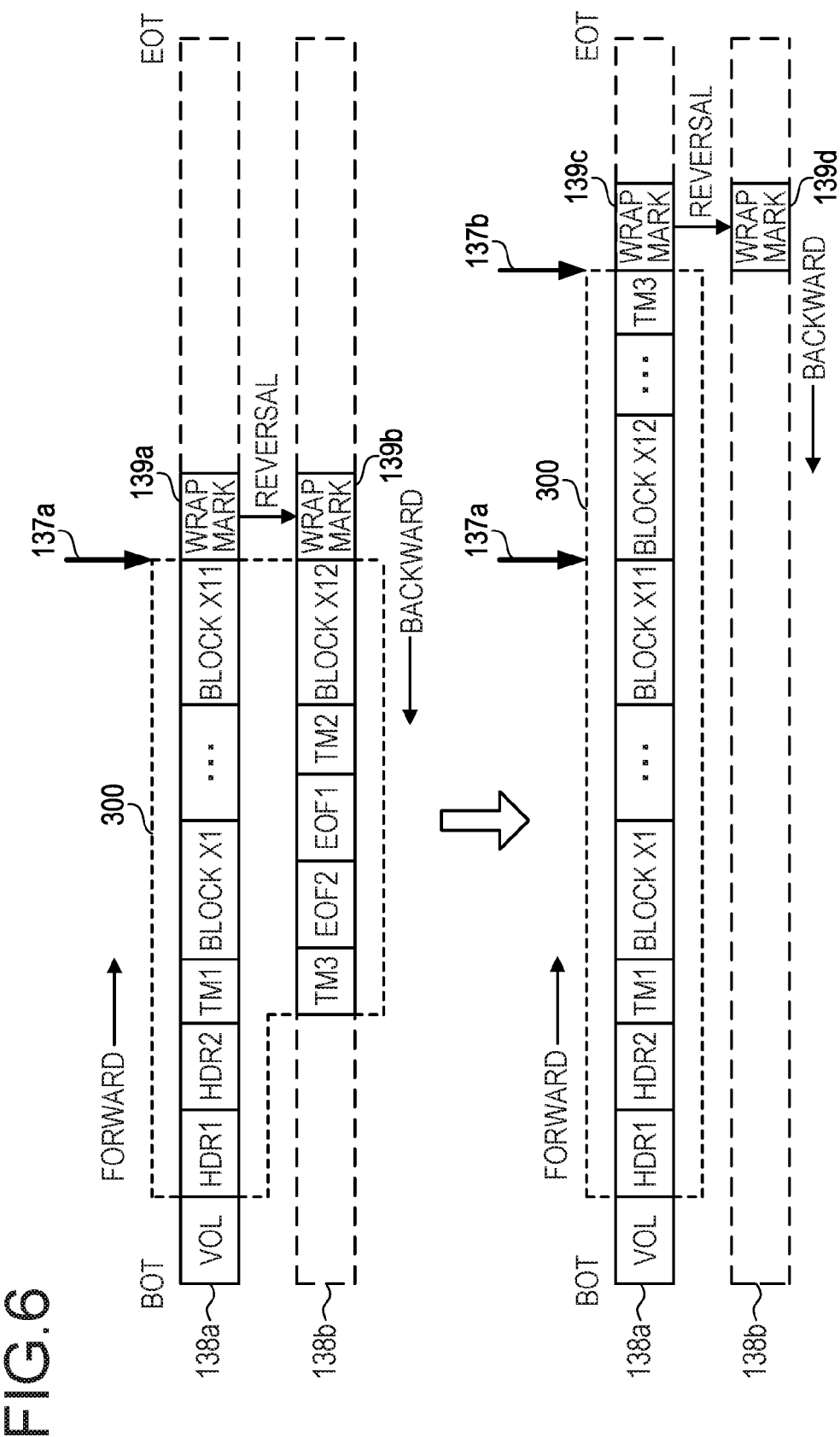
FIG. 6 is a diagram illustrating exemplary write processing in a 36 track mode.

FIG. 6 is a diagram illustrating exemplary write processing in the 36 track mode. The upper portion of FIG. 6 illustrates write processing according to a comparative example, and the lower portion of FIG. 6 illustrates write processing according to the present embodiment.

As an example of write processing in the 36 track mode, a method may be considered in which data is written by using the entirety of each WRAP from the WRAP beginning to the WRAP end starting from the WRAP at the head side. In this case, in the WRAP at the head side, data is written up to EOT. However, as a position of data to be read is closer to EOT, it takes a longer time for tape running for positioning of the magnetic head at the location of the data, therefore it takes a longer time before the start of data reading. In addition, when the end of the data is in the middle of backward WRAP, no data is written the BOT side in the WRAP, at which positioning of the magnetic head may be performed normally in a short time. Therefore, a wasteful time is consumed in the tape running for positioning of the magnetic head.

Therefore, a method may be considered in which a reversal position is set in the middle of a WRAP and the WRAP reversal is always performed at the reversal position in the forward data writing. The upper portion of FIG. 6 illustrates an example of this method.

In this method, a reversal position 137a common to forward WRAPs is set. For example, the reversal position 137a is set to a position, starting from BOT, which corresponds to a data amount obtained by dividing the upper limit of a limited write capacity by the total number of WRAPs. The reversal position 137a may be set to a predetermined position in an area from the position obtained by this calculation to the EOT.

The tape drive 120 performs the following write processing in response to an instruction received from the controller 110. Upon reaching the reversal position 137a in the middle of writing data in forward WRAP, the tape drive 120 writes a WRAP mark in the forward WRAP and performs the WRAP reversal. The tape drive 120 writes a WRAP mark at the reversal position 137a of the next backward WRAP and continues the writing in the backward WRAP.

In the example illustrated in the upper portion of FIG. 6, upon reaching the reversal position 137a in the middle of forward data writing into a WRAP 138a, the tape drive 120 writes a WRAP mark 139a in the WRAP 138a and performs the WRAP reversal. The tape drive 120 writes a WRAP mark 139b in the next WRAP 138b at an identical position as the WRAP mark 139a and continues the writing into the backward WRAP 138b.

According to this method, data is written in an area from BOT to the reversal position 137a in all WRAPs. Therefore, an area of the magnetic tape in which the magnetic head is positioned in reading is limited to a range from BOT to the reversal position 137a, thereby shortening a time taken until the start of data reading. When data is additionally written, the time taken for the positioning of the magnetic head at a position at which the additional data writing is started may be shorten, and the additional data writing may be started in a shorter time. When the reversal position 137a is set to the position obtained by the above-described calculation, the time taken for the positioning of the magnetic head may be minimized.

This method has the following problem. As illustrated in the upper portion of FIG. 6, upon reaching the reversal position 137a in the middle of a file area 300 corresponding to a file, the WRAP reversal is performed. When this file is divided into blocks X1 to X12 and the reversal position 137a is reached at the point of the end of writing the data block x11, the WRAP mark 139a is written next to the data block X11, and the WRAP reversal is performed. In the next WRAP 138b, the WRAP mark 139b is written, and then, the remaining data block X12 is written in the backward direction.

In the state where such writing is performed, when a file in the file area 300 is required to be read, the WRAP reversal occurs in the middle of reading the file. The WRAP reversal requires a certain time since at least operations of the stop and the restart of tape running occurs in the WRAP reversal. Therefore, it takes a longer time for file reading than when the entire file recorded in one WRAP is read.

According to the second embodiment, processing as illustrated in the lower portion of FIG. 6 is performed. Upon reaching a reversal position 137a in the middle of writing a file area 300 into a WRAP 138a, the tape drive 120 continues the writing up to the end of the file area 300. The tape drive 120 writes a WRAP mark 139*c* next to an end position 137*b* of the file area 300 and performs the WRAP reversal. The tape drive 120 writes a WRAP mark 139*d* in the next WRAP 138*b* at an identical position as the WRAP mark 139*c*. When the next file is required to be written, backward data writing is performed in the WRAP 138*b* following the WRAP mark 139*d*.

Accordingly, when the tape drive 120 reads a file of the file area 300, the WRAP reversal is not performed in the middle of reading the file area 300. Therefore, data reading of the file may be completed earlier by a time taken for the WRAP reversal than that illustrated in the upper portion of FIG. 6.

Figure 7:
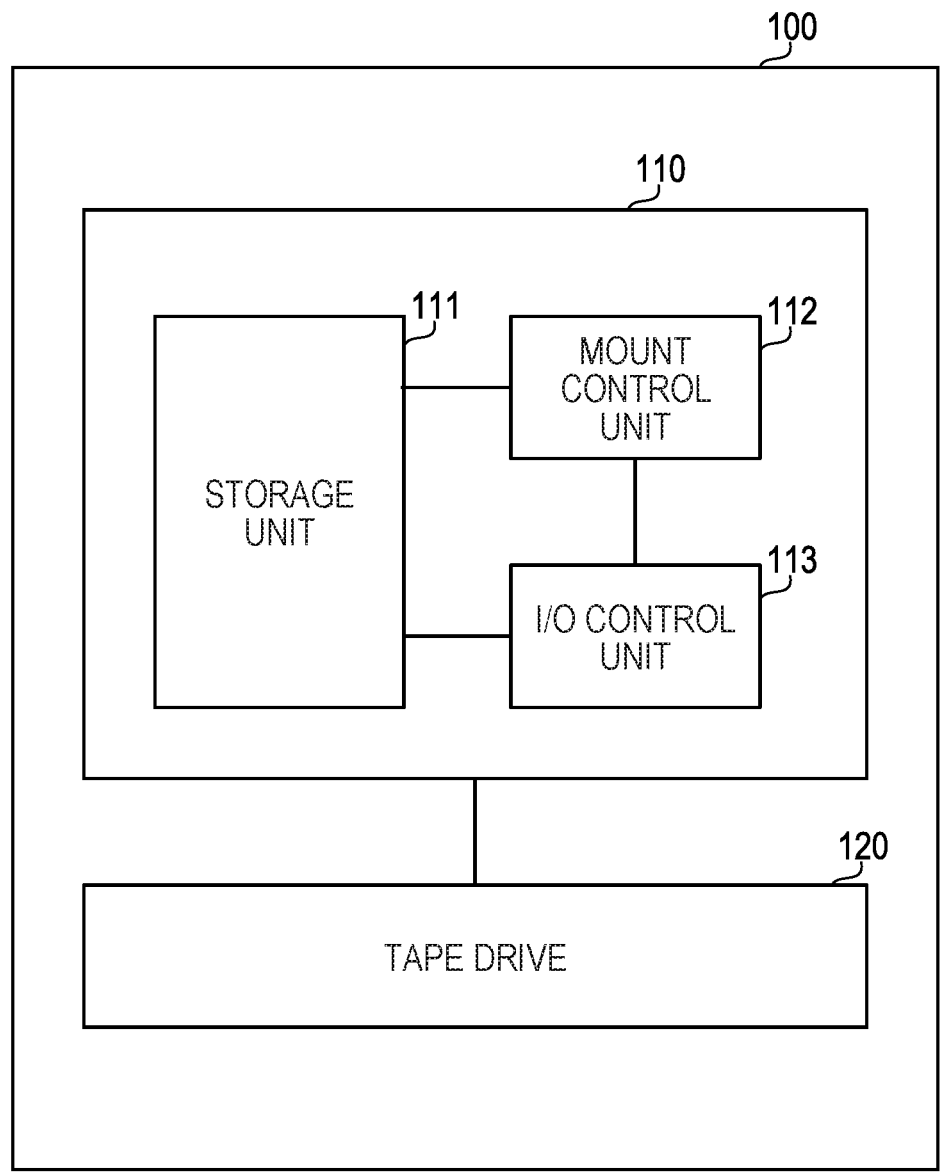
FIG. 7 is a diagram illustrating an exemplary functional configuration of a controller.

FIG. 7 is a diagram illustrating an exemplary functional configuration of a controller. The controller 110 includes a storage unit 111, a mount control unit 112, and an input/output (I/O) control unit 113.

The storage unit 111 is implemented as a memory area secured in the RAM 110*b* or the flash memory 110*c*. The storage unit 111 stores therein a medium specification table, a medium information table, and a write management table.

Specification information such as, for example, the numbers of WRAPs corresponding to the respective generations of LTO is registered in the medium specification table. The information stored in the cartridge memory 130*a* is registered in the medium information table. This information includes a serial number of the tape cartridge 130, a residual capacity thereof, and data capacities already written in the respective WRAPs. The management information required to control the data writing operation is registered in the write management table.

The mount control unit 112 and the I/O control unit 113 are implemented, for example, when the processor 110*a* executes a program module.

Upon receiving a mount instruction from the host device 200, the mount control unit 112 instructs the tape drive 120 to mount the tape cartridge 130. When the tape cartridge 130 is mounted, the mount control unit 112 calculates a standard WRAP capacity indicating the data capacity from BOT to a standard reversal position and stores the calculated standard WRAP capacity in the storage unit 111. The standard reversal position refers to a standard position at which the WRAP reversal is performed in the middle of forward WRAP, and is determined before the writing operation is started. The standard reversal position corresponds to the reversal position 137*a* in the lower portion of FIG. 6.

Upon receiving an I/O instruction from the host device 200, the I/O control unit 113 instructs the mounted tape cartridge 130 to perform, in accordance with the I/O instruction, an I/O operation for a magnetic tape in the tape cartridge 130. The I/O instruction from the host device 200 includes a write instruction and a read instruction. The write instruction includes, for example, a label write instruction, a marker write instruction, and a data block write instruction.

A write control mode of the I/O control unit 113 includes a normal control mode and a fast control mode. The normal control mode is a mode of writing data in the entire area from BOT to EOT. The fast control mode is a mode of writing a WRAP mark in the middle of an area from BOT to EOT. The fast control mode is a control mode for improving read performance by reducing the time taken to position the magnetic head in the reading.

In the writing in the 36 track mode, the fast control mode is selected. In the writing in forward WRAP by the fast control mode, the I/O control unit 113 basically controls the tape cartridge 130 to reverse the write direction at the standard reversal position. However, upon reaching the standard reversal position in the middle of the file writing, the I/O control unit 113 continues the forward data writing up to the end of a file area corresponding to the file and then controls the tape cartridge 130 to reverse the write direction.

FIG. 8 is a diagram illustrating an example of a medium specification table. A medium specification table 111*a* is stored in the storage unit 111. Each record of the medium specification table 111*a* includes items of the "Generation", "Data capacity", "Number of tracks", and "Number of WRAPs per data band". The generation of LTO is registered in the "Generation" item. The amount of data which may be written in the magnetic tape is registered in the "Data capacity" item. The number of tracks in the entire magnetic tape is registered in the "Number of tracks" item. The number of WRAPs included in one data band is registered in the "Number of WRAPs per data band" item.

For example, a record including a generation of "LTO1", a data capacity of "100 GB", the number of tracks of "384", and the number of WRAPs per data band of "12" is registered in the medium specification table 111*a*. This indicates that, for LTO1 (LTO Ultrium 1), the data amount which may be written in the magnetic tape is "100 GB", the number of tracks is "384", and the number of WRAPs per data band is "12".

Figure 9:
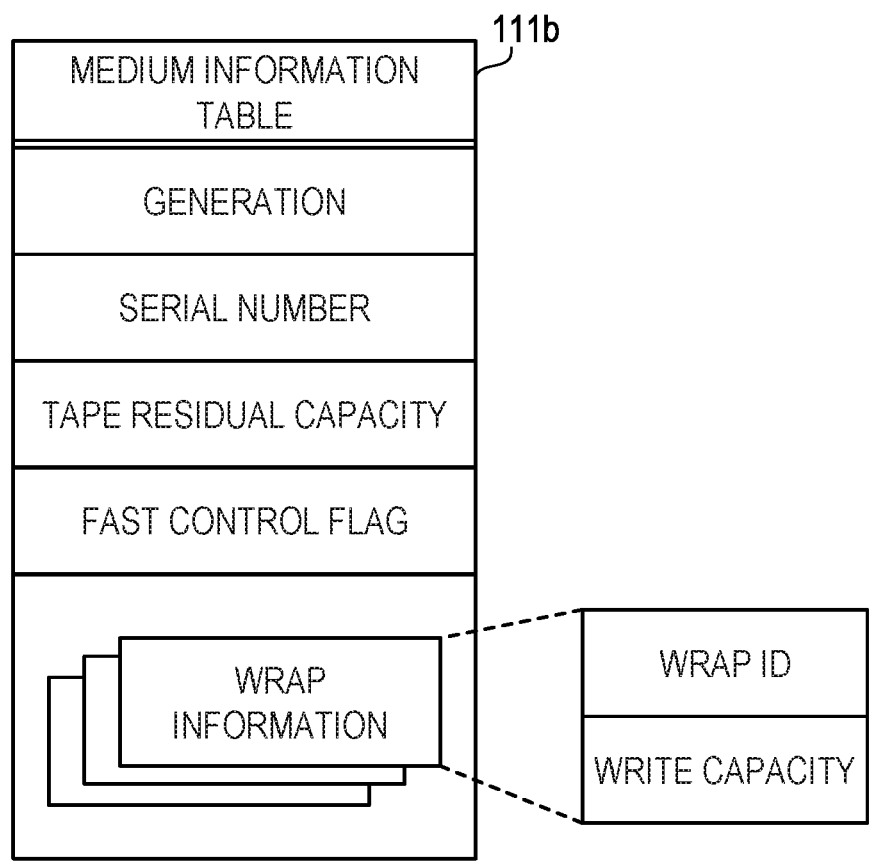
FIG. 9 is a diagram illustrating an example of a medium information table.

FIG. 9 is a diagram illustrating an example of a medium information table. A medium information table 111*b* is stored in the storage unit 111. The medium information table 111*b* includes items "Generation", "Serial number", "Tape residual capacity", and "Fast control flag".

The generation of LTO is registered in the "Generation" item. The serial number of the tape cartridge 130 is registered in the "serial number item". The residual capacity of the magnetic tape is registered in the "Tape residual capacity" item.

The information indicating whether or not the fast control mode is performed is registered in the "Fast control flag" item. The "true" (perform the fast control mode) or "false" (not perform the fast control mode) is registered in the "Fast control flag" item. When the tape cartridge 130 is unused, "false" or "- (hyphen)" is registered in the "Fast control flag" item.

"WRAP information" is also contained in the medium information table 111*b*. The "WRAP information" is provided for each WRAP of the magnetic tape in the corresponding tape cartridge 130. The "WRAP information" includes items of "WRAP identifier (ID)" and "Write capacity". The information identifying a WRAP is registered in the "WRAP ID" item. The data capacity already written in the WRAP is registered in the "Write capacity" item.

The information of an identical data structure as the medium information table 111*b* is registered in the cartridge memory 130*a* of the tape cartridge 130. When the tape cartridge 130 is mounted on the tape drive 120, the controller 110 reads the information recorded in the cartridge memory 130*a* and records the read information, as the medium information table 111*b*, in the storage unit 111. In addition, upon updating the information recorded in the medium information table 111*b*, the controller 110 reflects the update in the corresponding information in the cartridge memory 130*a*. In addition, upon unmounting the tape cartridge 130, the tape drive 120 updates the "Tape residual capacity" item in the cartridge memory 130*a*.

Figure 10:
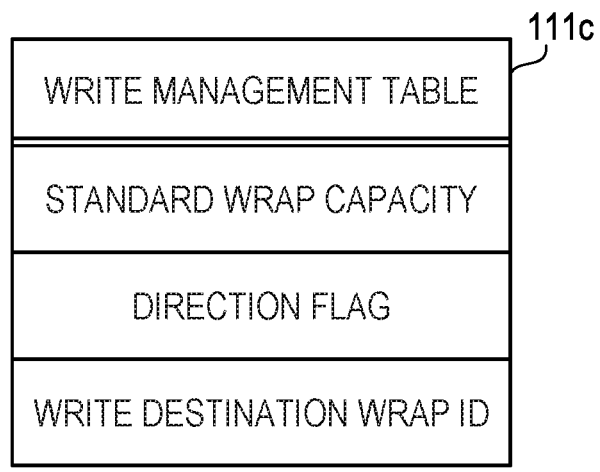
FIG. 10 is a diagram illustrating an example of a write management table.

FIG. 10 is a diagram illustrating an example of a write management table. A write management table 111*c* is stored in the storage unit 111. The write management table 111*c* includes items of "Standard WRAP capacity", "Direction flag", and "Write destination WRAP ID".

The "Standard WRAP capacity" indicates a data capacity of WRAP from BOT to the standard reversal position. For example, the "Standard WRAP capacity" may be obtained on the basis of the relationship between the maximum write capacity in the 36 track mode and the number of WRAPs. In the example illustrated in the lower portion of FIG. 6, the "standard reversal position corresponds to the reversal position 137a, and the "Standard WRAP capacity" corresponds to the data capacity of the WRAP 138a from BOT to the reversal position 137a. The "Direction flag" is flag information indicating the current write direction. The "Write destination WRAP ID" is information identifying the current write destination WRAP.

Figure 11:
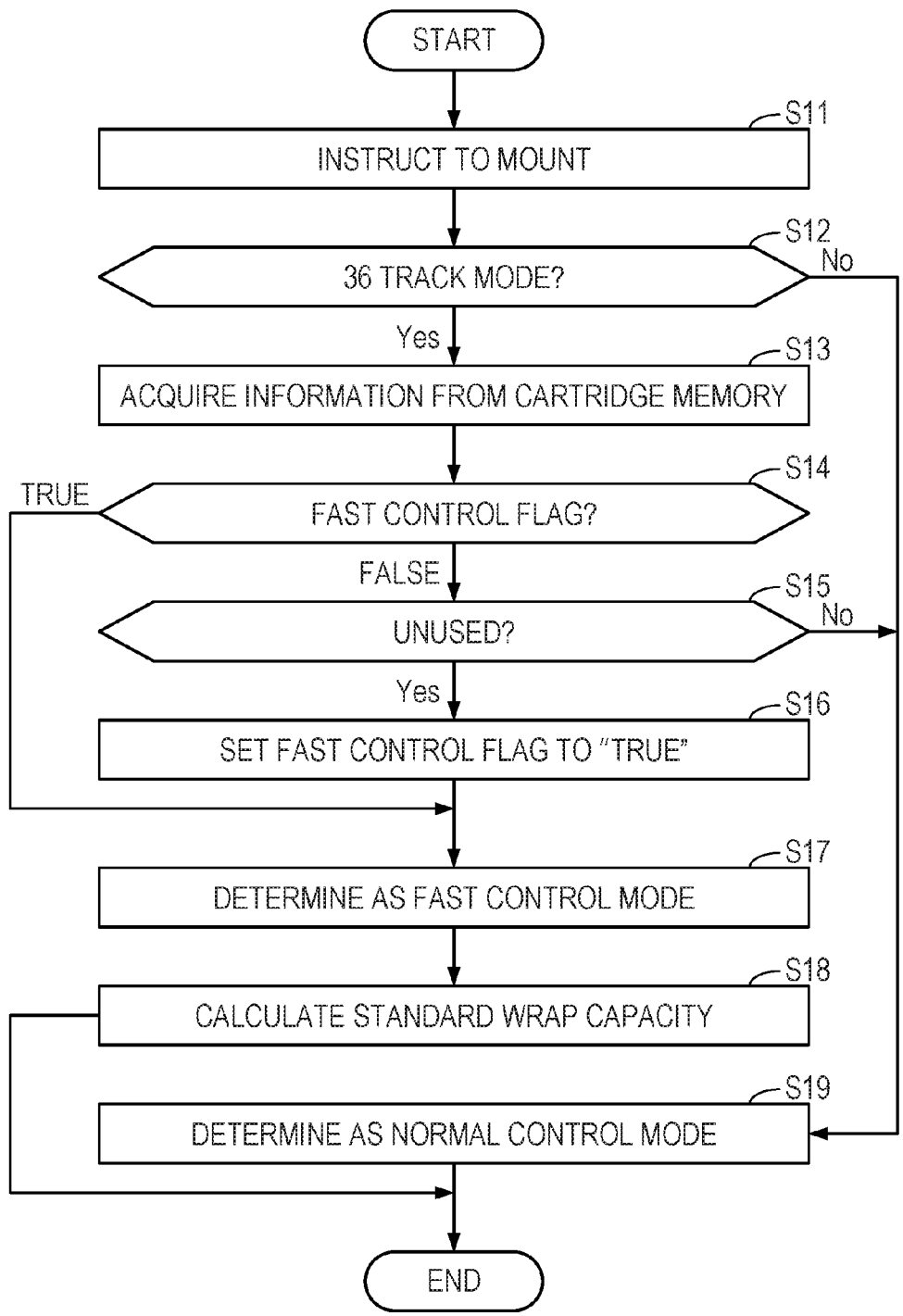
FIG. 11 is a flowchart illustrating exemplary mount processing.

FIG. 11 is a flowchart illustrating an exemplary mount processing. Hereinafter, the processing illustrated in FIG. 11 will be described. The processing of FIG. 11 starts when the mount control unit 112 receives a mount instruction from the host device 200. The mount control unit 112 also receives a designation of a write mode from the host device 200.

(S11) The mount control unit 112 instructs the tape drive 120 to mount the tape cartridge 130. Accordingly, the tape drive 120 mounts the tape cartridge 130.

(S12) The mount control unit 112 determines whether or not a write instruction of a 36 track mode is received from the host device 200. When it is determined that the write instruction of a 36 track mode is received, the processing proceeds to S13. When it is determined that the write instruction of a 36 track mode is not received, the processing proceeds to S19.

(S13) The mount control unit 112 instructs the tape drive 120 to acquire information recorded in the cartridge memory 130a. Specifically, the acquired information is "Generation", "Serial number", "Tape residual capacity", "Fast control flag", and "WRAP ID" and "WRAP write capacity" of each WRAP. The mount control unit 112 registers the acquired information in the medium information table 111b.

(S14) The mount control unit 112 determines whether or not the fast control flag is "true", by referring to the "Fast control flag" of the medium information table 111b. When it is determined that the fast control flag is "true", the processing proceeds to S17. When it is determined that the fast control flag is "false", the processing proceeds to S15.

(S15) The mount control unit 112 determines whether or not the tape cartridge 130 is unused. Specifically, the mount control unit 112 identifies a data capacity corresponding to the generation of the medium information table 111b on the basis of the medium specification table 111a. When the identified data capacity matches the "Tape residual capacity" of the medium information table 111b, the mount control unit 112 determines that the tape cartridge 130 is unused. When it is determined that the tape cartridge 130 is unused, the processing proceeds to S16. When it is determined that the tape cartridge 130 is not unused, the processing proceeds to S19.

(S16) The mount control unit 112 registers "true" in the "Fast control flag" of the medium information table 111b.

(S17) Since the "Fast control flag" of the medium information table 111b is "true", the mount control unit 112 determines that the writing is to be performed in the fast control mode.

(S18) The mount control unit 112 calculates a standard WRAP capacity. The mount control unit 112 registers the calculated standard WRAP capacity in the "Standard WRAP capacity" item of the write management table 111c.

The standard WRAP capacity is calculated in accordance with the following method. For example, when a data block size is 32 KB, the maximum capacity which may be written in the 36 track mode is 128 GB (32 KB×4,000,000 data blocks). The standard WRAP capacity is calculated by an expression of "12 GB/total number of WRAPs". The total number of WRAPs is calculated by an expression of "number of WRAPs per data band×number of data bands". Here, the number of WRAPs per data band and the "number of data bands" are obtained on the basis of information of a record corresponding to the "Generation" of the medium information table 111b, among the records of the medium specification table 111a. For example, when the generation is LTO4, the standard WRAP capacity is "128 GB/(14×4)" (about 2.3 GB).

The standard WRAP capacity indicates the capacity of WRAP from BOT to the standard reversal position. Accordingly, the standard reversal position suited for the generation of the mounted tape cartridge 130 may be calculated by the above-described calculation. The calculated standard reversal position indicates a reversal position closest to BOT when the data of the maximum capacity which may be written in the 36 track mode are written in the magnetic tape. By using such a standard reversal position as a standard position (corresponding to the reversal position 137a of FIG. 6) for determining whether to perform the WRAP reversal in the writing into forward WRAP, the position of the WRAP reversal may be make closer to BOT as much as possible. As a result, the read time of the written data may be shortened.

The standard WRAP capacity is determined on the basis of the specification of the magnetic tape and the maximum capacity which may be written in the 36 track mode. Therefore, for example, the standard WRAP capacity may be registered in the medium specification table 111a in advance for each generation of the magnetic tape. In this case, at S18, the mount control unit 112 may acquire the standard WRAP capacity corresponding to the generation of the mounted magnetic tape from the medium specification table 111a without performing the above-described calculation.

(S19) Since the "Fast control flag" of the medium information table 111b is "false", the mount control unit 112 determines that the writing is to be performed in the normal control mode. Then, the processing is ended.

Figure 12:
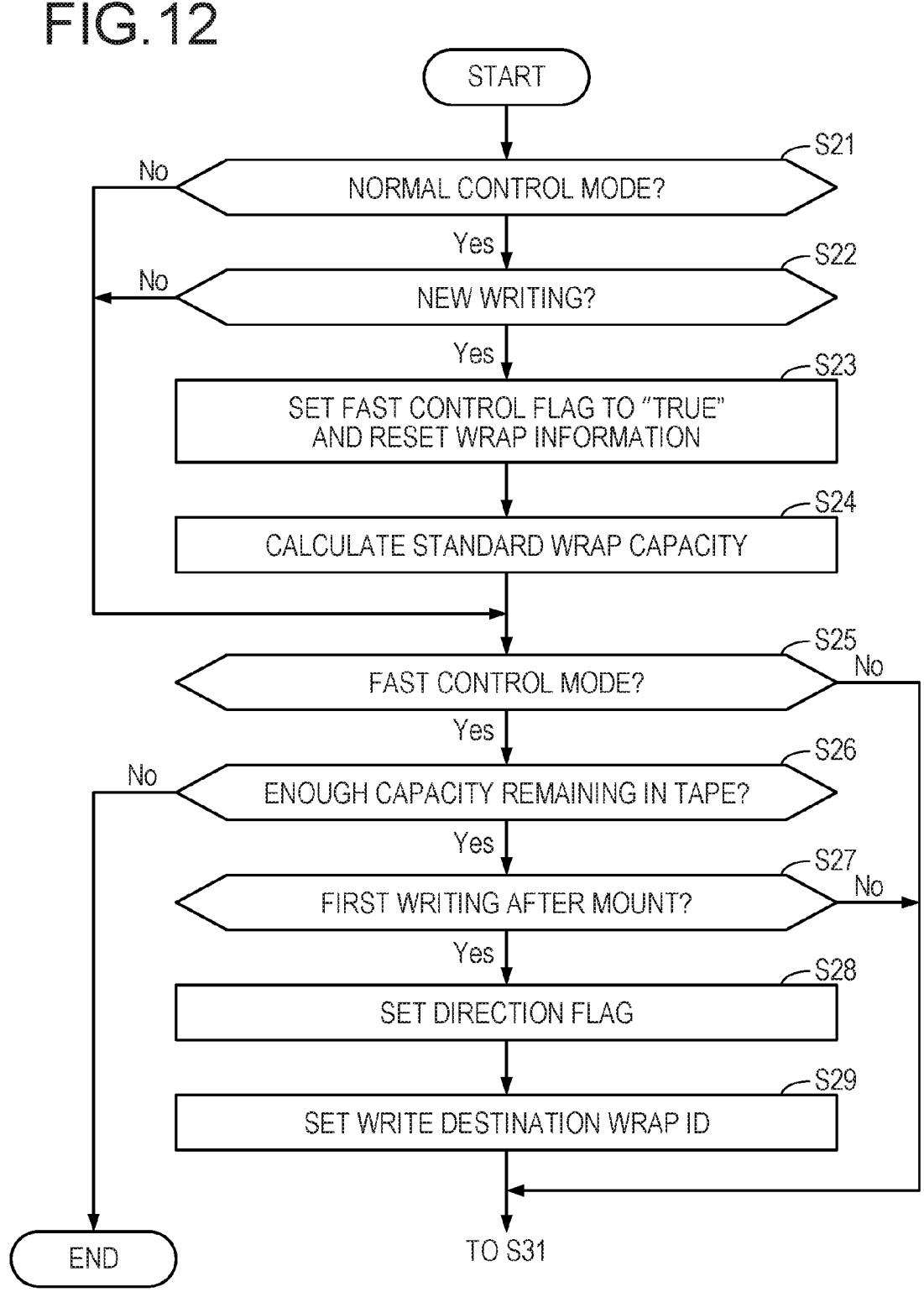
FIG. 12 is a flowchart illustrating exemplary write processing
Figure 13:
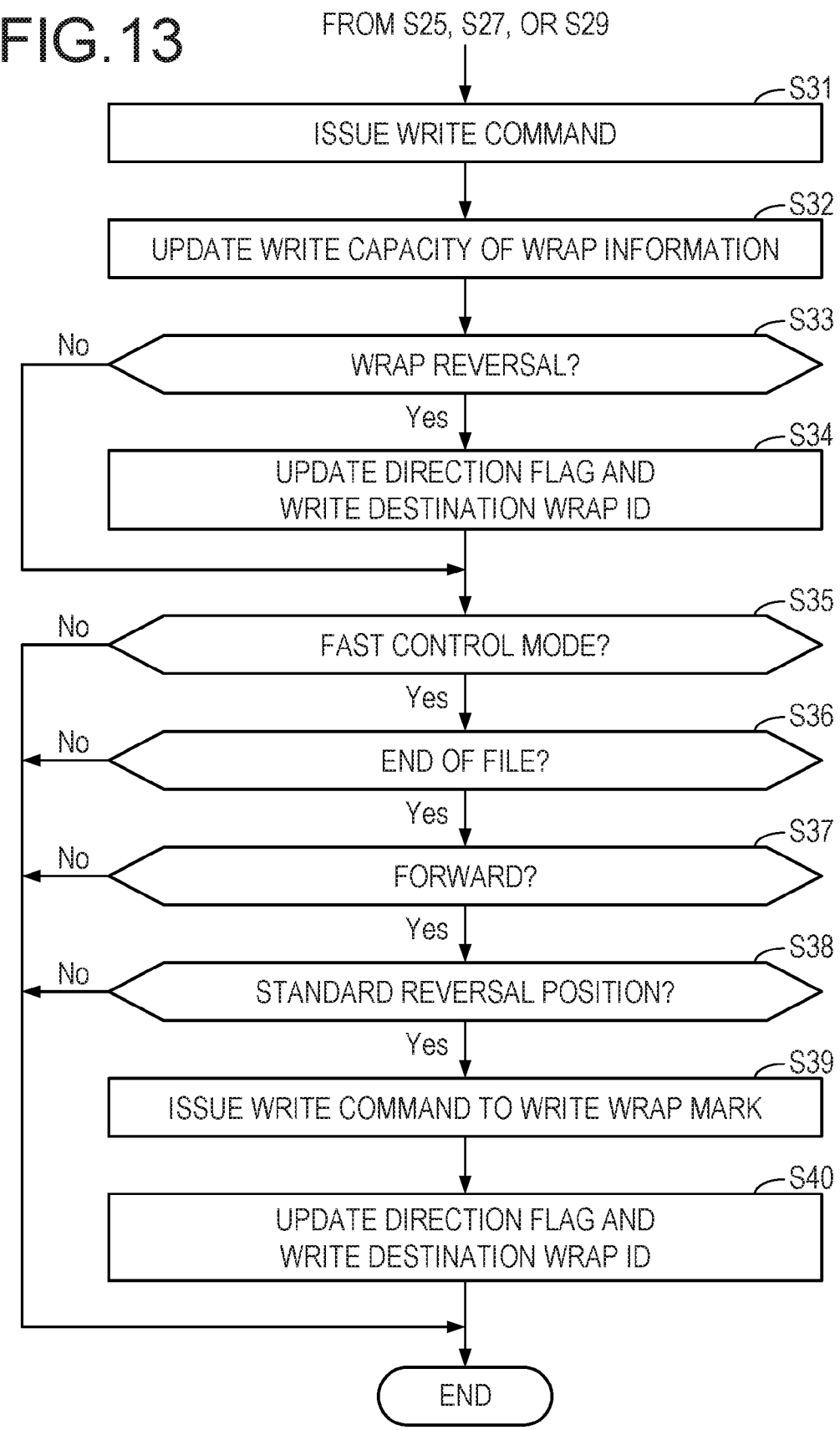
FIG. 13 is a flowchart illustrating exemplary write processing

Next, an exemplary write processing will be described with reference to FIGS. 12 and 13. The processing of FIGS. 12 and 13 is performed every time a write instruction is received from the host device 200. The write instruction includes, for example, a label write instruction, a marker write instruction, and a data block write instruction.

FIG. 12 is a flowchart illustrating an exemplary write processing. Hereinafter, the processing illustrated in FIG. 12 will be described.

(S21) The I/O control unit 113 determines whether or not the writing is performed in the normal control mode, by referring to the "Fast control flag" of the medium information table 111b. When the "Fast control flag" is "false", it is determined that the writing is performed in the normal control mode. When it is determined that the writing is performed in the normal control mode, the processing proceeds to S22. When it is determined that the writing is performed in the fast control mode, the processing proceeds to S25.

(S22) The I/O control unit 113 determines whether to discard the written data to perform new writing in spite of the fact that the tape cartridge 130 is a used medium. For example, when it is determined that the magnetic tape is fully rewound immediately before the processing of FIG. 12 after the end of the processing of FIG. 11, the I/O control unit 113 determines that new writing is to be performed, and then, the processing proceeds to S23. When it is determined that the magnetic tape is not rewound immediately before the processing of FIG. 12, the processing proceeds to S25. For example, when the rewinding is performed, a predetermined flag in the storage unit 111 may be set to "1" and on the basis of this flag, it may be determined that whether the rewinding has been performed at S22.

(S23) The I/O control unit 113 determines that the writing is to be performed in the fast control mode and registers "true" in the "Fast control flag" of the medium information table 111b. In addition, the I/O control unit 113 sets the "Write capacity" in the entire "WRAP information" of the medium information table 111b to "0" to reset the entire "WRAP information".

(S24) The I/O control unit 113 calculates the standard WRAP capacity and registers the standard WRAP capacity in the write management table 111c. The calculation method is identical to that illustrated in S18.

(S25) The I/O control unit 113 determines whether or not the writing is to be performed in the fast control mode, by referring to the "Fast control flag" of the medium information table 111b. When it is determined that the writing is to be performed in the fast control mode, the processing proceeds to S26. When it is determined that the writing is to be performed in the normal control mode, the processing proceeds to S31 of FIG. 13.

(S26) The I/O control unit 113 determines whether or not the data (any of a label, a marker, and a data block) instructed to be written from the host device 200 may be written. Specifically, the I/O control unit 113 calculates the total capacity, which is the sum of the entire WRAP write capacities, by referring to the entire "WRAP information" of the medium information table 111b. The I/O control unit 113 determines whether or not the capacity of the data instructed to be written from the host device 200 is smaller than the capacity obtained by subtracting the total capacity from 128 GB which is the maximum capacity which may be written in the 36 track mode. When it is determined that the capacity of the data instructed to be written is smaller, the processing proceeds to S27. When it is determined that the capacity of the data instructed to be written is not smaller, this indicates that the amount of the written data already reaches a limit. Therefore, the I/O control unit 113 transmits, to the host device 200, a notification indicating that the data is unable to be written in the tape cartridge 130. Then, the processing is ended.

(S27) The I/O control unit 113 determines whether or not the writing is first writing which is performed first after the tape cartridge 130 is mounted. When it is determined that the writing is first writing, the processing proceeds to S28. When it is determined that the writing is not first writing, the processing proceeds to S31 of FIG. 13.

(S28) The I/O control unit 113 determines whether or not the write direction is forward. Specifically, the I/O control unit 113 makes a calculation in accordance with the following expression (1).

$$\text{"Tape residual capacity" of medium information table } 111b/\text{WRAP capacity} \qquad (1)$$

The WRAP capacity in the expression (1) is calculated in accordance with the expression of "data capacity/(number of data bands×number of WRAPs per data band)", on the basis of the information of a record corresponding to the "Generation" of the medium information table 111b, among the records of the medium specification table 111a.

The quotient of the expression (1) indicates the number of remaining WRAPs in which data is not written at all. When the number of the remaining WRAPs is odd, it is determined that the current write direction is forward. When the number of the remaining WRAPs is even, it is determined that the current write direction is backward.

The I/O control unit 113 sets a value corresponding to the result of the determination on the write direction, in the "Direction flag" of the write management table 111c. For example, the I/O control unit 113 sets the "Direction flag" to "0" when the write direction is forward and sets the "Direction flag" to "1" when the write direction is backward.

(S29) The I/O control unit 113 determines a WRAP of the current write destination. Assuming that the quotient of the expression (1) is Q, it is determined that a (Q+1)-th WRAP from the last is the WRAP of the current write destination. The I/O control unit 113 registers an ID indicating the determined WRAP of the current write destination in the item of "Write destination WRAP ID" of the write management table 111c. Then, the processing proceeds to S31 of FIG. 13.

Here, exemplary processing of S28 and S29 will be described with reference to FIGS. 14A and 14B. FIGS. 14A and 14B are diagrams illustrating exemplary processing of determining a write direction and a write destination WRAP. In FIGS. 14A and 14B, for sake of understandability, it is assumed that four WRAPs 311 to 314 are formed in a magnetic tape. The WRAPs 311 and 313 are forward WRAPs, and WRAPs 312 and 314 are backward WRAPs.

In FIG. 14A, forward data writing is performed up to the middle of the WRAP 311. An area R1a is an area in which data has been written. The area R1a does not reach the standard reversal position, and no WRAP mark is recorded in an EOT side of the area R1a. Areas R1b and R2 to R4 are areas in which no data is written.

In this case, the "Tape residual capacity" copied from the cartridge memory 130a into the medium information table 111b is the sum of the entire capacities of the areas R1b and R2 to R4. It is determined at S28 that the quotient of the expression (1) is "3" and the write direction is forward. In addition, it is determined at S29 that the fourth WRAP 311 from the last is the current write destination.

FIG. 14B illustrates a case where the forward data writing is performed up to the middle of the WRAP 311, and the WRAP reversal is performed in the end of the forward data writing. For example, this is a case where an area of a file crosses over the standard reversal position, and the WRAP reversal is performed in the end of the area. In FIG. 14B, an area R1c is an area in which data has been already written, and the end of the area R1c crosses over the standard reversal position. A WRAP mark 311a is recorded in the end position of the area R1c, and a WRAP mark 312a is recorded in the WRAP 312 at an identical position as the WRAP mark 311a. Accordingly, the current write destination WRAP is the WRAP 312. Areas R1d, R2a, R2b, R3, and R4 are areas in which no data is written.

In this case, the "Tape residual capacity" copied from the cartridge memory 130a into the medium information table 111b is the sum of the entire capacities of the areas R2a, R3, and R4. It is determined at S28 that the quotient of the expression (1) is "2" and the write direction is backward. In addition, it is determined at S29 that the third WRAP 312 from the last is the current write destination.

At S28, the write direction may be determined in accordance with the following method, instead of the above-described calculation. Before instructing the tape drive 120 to unmount the tape cartridge 130, the mount control unit 112 instructs the tape drive 120 to record the write direction at that point in the cartridge memory 130*a*. Accordingly, the write direction is recorded in the cartridge memory 130*a* of the unmounted tape cartridge 130. When the tape cartridge 130 is mounted again, the mount control unit 112 acquires the write direction recorded in the cartridge memory 130*a* and copies the write direction into the storage unit 111. At S28, the I/O control unit 113 determines the current write direction on the basis of the write direction copied into the storage unit 111.

FIG. 13 is a flowchart illustrating exemplary write processing. Hereinafter, the processing illustrated in FIG. 13 will be described.

(S31) The I/O control unit 113 issues, to the tape drive 120, a write command to instruct to write the data instructed to be written from the host device 200. The tape drive 120 writes any of a label, a marker, and a data block instructed to be written from the host device 200, in the magnetic tape in the tape cartridge 130. The tape drive 120 writes the instructed data in the forward direction when the current write direction is forward, and writes the instructed data in the backward direction when the current write direction is backward.

When the position at which the instructed data writing has been completed corresponds to a position within a predetermined capacity up to BOT or EOT, the tape drive 120 performs the WRAP reversal by recording a WRAP mark in the position. The tape drive 120 records a WRAP mark at an identical position of the next WRAP and waits for the next write command.

(S32) The I/O control unit 113 identifies, in the medium information table 111*b*, the "WRAP information" corresponding to the current write destination WRAP. The I/O control unit 113 updates the "Write capacity" of the "WRAP information" by adding an amount of the write data (capacity of any of a label, a marker, and a data block) written in the magnetic tape in accordance with the command issued at S31, to the "Write capacity" of the relevant "WRAP information".

(S33) The I/O control unit 113 determines whether or not the WRAP reversal occurs in the tape drive 120 in response to the command issued at S31.

Specifically, when the "Direction flag" of the write management table 111*c* indicates the forward direction, the I/O control unit 113 calculates a difference between the "Write capacity" updated at S32 and a capacity of one WRAP. When the calculated difference is below a predetermined value, this means that the write position reaches near EOT and, accordingly, the I/O control unit 113 determines that the WRAP reversal has occurred.

When the "Direction flag" of the write management table 111*c* indicates the backward direction, the I/O control unit 113 calculates a difference between the "Write capacity" updated at S32 and the "Write capacity" registered in the "WRAP information" corresponding to the previous wrap. When the calculated difference is below a predetermined value, this means that the write position reaches BOT and, accordingly, the I/O control unit 113 determines that the WRAP reversal has occurred.

When it is determined that the WRAP reversal occurs, the processing proceeds to S34. When it is determined that no WRAP reversal occurs, the processing proceeds to S35.

(S34) The I/O control unit 113 updates the "Direction flag" of the write management table 111*c* to the other value.

In addition, the I/O control unit 113 updates the "Write destination WRAP ID" of the write management table 111*c* to an ID of the next WRAP.

(S35) The I/O control unit 113 determines whether or not the current control mode is the fast control mode, by referring to the "Fast control flag" of the medium information table 111*b*. When it is determined that the current control mode is the fast control mode, the processing proceeds to S36. When it is determined that the current control mode is the normal control mode, the processing is ended.

(S36) The I/O control unit 113 determines whether or not the end of a file area is reached. Specifically, the I/O control unit 113 determines whether or not the write command issued at S31 has instructed to write TM3. When it is determined that the write command issued at S31 has instructed to write TM3, it is determined that the end of the file area is reached. When it is determined that the end of the file area is reached, the processing proceeds to S37. When it is determined that the end of the file area is not reached, the processing is ended.

(S37) The I/O control unit 113 determines the current write direction on the basis of the "Direction flag" of the write management table 111*c*. When it is determined that the write direction is forward, the processing proceeds to S38. When it is determined that the write direction is backward, the processing is ended.

(S38) The I/O control unit 113 determines whether or not the write position has reached the standard reversal position. Specifically, the I/O control unit 113 identifies, among the "WRAP information" of the medium information table 111*b*, the "WRAP information" corresponding to the "Write destination WRAP ID" of the write management table 111*c*. The I/O control unit 113 subtracts the "Write capacity" of the relevant "WRAP information" from the "Standard WRAP capacity" of the write management table 111*c*. When the result of the subtraction is 0, this means that data is written up to the standard reversal position. When the result of the subtraction is minus, this means that data is written over the standard reversal position. In these cases, it is determined that the write position has reached the standard reversal position, and then, the processing proceeds to S39. When the result of the subtraction is larger than 0, it is determined that the write position has not reached the standard reversal position and, then, the processing is ended.

(S39) The I/O control unit 113 issues, to the tape drive 120, a write command to instruct to write a WRAP mark. Upon receiving the write command, the tape drive 120 writes a WRAP mark in the forward WRAP being currently written, reverses the write direction, and writes a WRAP mark in the next backward WRAP. Thereafter, when data writing is instructed by performing the processing of FIGS. 12 and 13, the tape drive 120 performs backward writing for the backward WRAP.

(S40) The I/O control unit 113 updates the "Direction flag" of the write management table 111*c* to the backward direction. In addition, the I/O control unit 113 updates the "Write destination WRAP ID" of the write management table 111*c* to an ID of the next WRAP. Then, the processing is ended.

Figure 15:
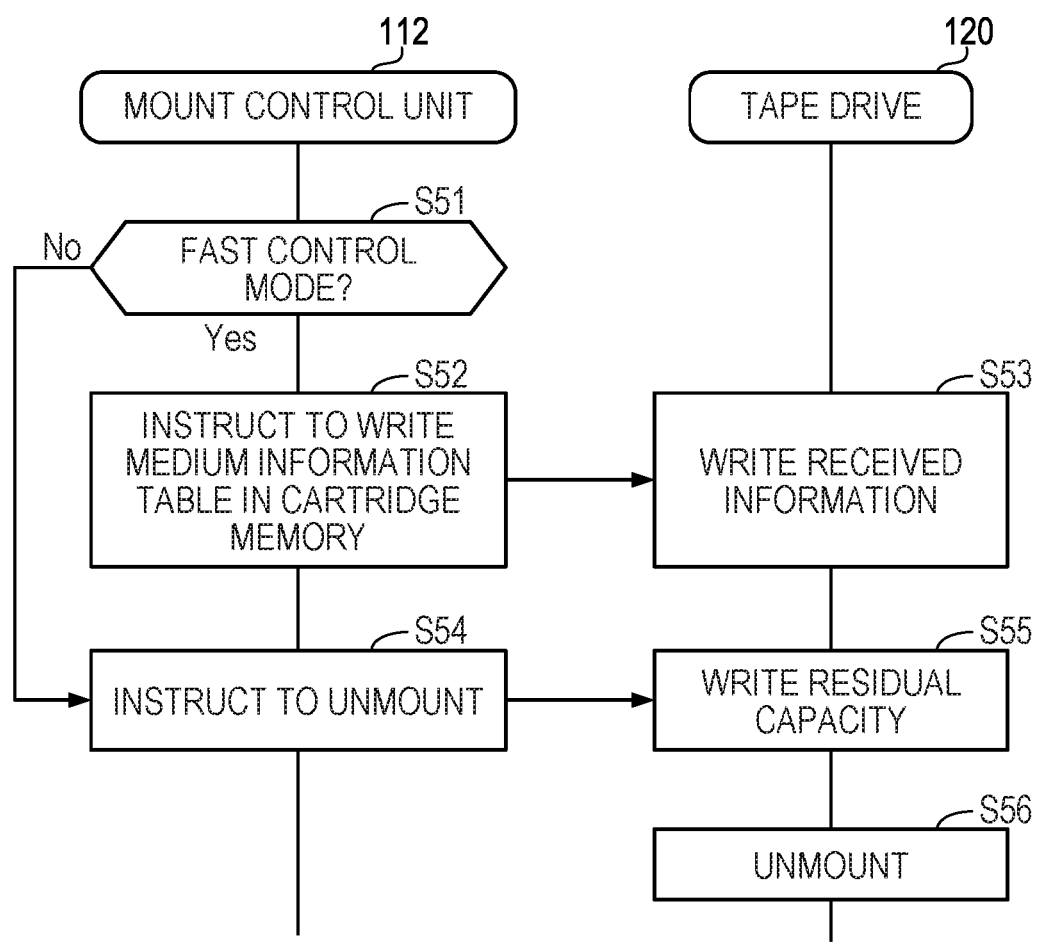
FIG. 15 is a sequence diagram illustrating exemplary unmount processing.

FIG. 15 is a sequence diagram illustrating exemplary unmount processing. Hereinafter, the processing illustrated in FIG. 15 will be described. The processing of FIG. 15 starts when the mount control unit 112 receives an unmount instruction from the host device 200.

The mount control unit 112 determines whether or not the current control mode is the fast control mode (S51). When it is determined that the current control mode is the fast control mode, the mount control unit 112 transmits the "Fast control flag" and "WRAP information" of the medium information table 111b to the tape drive 120 and instructs the tape drive 120 to write the "Fast control flag" and "WRAP information" in the cartridge memory 130a (S52). In accordance with this instruction, the tape drive 120 writes the information received from the mount control unit 112 in the cartridge memory 130a (S53). When it is determined at S51 that the current control mode is the normal control mode, the processing of S52 and S53 is skipped.

The mount control unit 112 instructs the tape drive 120 to unmount the tape cartridge 130 (S54). Upon receiving this instruction, the tape drive 120 writes the residual capacity of the magnetic tape managed by the tape drive 120 in the cartridge memory 130a (S55). When the writing is completed, the tape drive 120 unmounts the tape cartridge 130 (S56).

According to the second embodiment described above, when the write position crosses over the standard reversal position while the information corresponding to one file is being written in a forward WRAP, the I/O control unit 113 instructs the tape drive 120 to write a WRAP mark after writing the information in the forward WRAP up to the end of the information. Accordingly, when the tape drive 120 reads the file, the read processing finishes without performing the WRAP reversal in the middle of the reading. Therefore, the time taken for reading the file may be shortened.

Third Embodiment

Next, a third embodiment will be described. The following description will be focused on portions different from the above-described second embodiment and descriptions about the similar portions as the second embodiment are not repeated.

According to the second embodiment, a WRAP mark is written after a file crossing over a standard reversal position is written. When the file is written beyond the standard reversal position, depending on the size of the file, there is a possibility that the file does not fit into an area starting from the standard reversal position to the position of EOT. That is, there is a possibility that the WRAP reversal occurs at the position of EOT in the middle of the file writing. Therefore, the third embodiment provides a function to cope with such a case.

A tape device according to the third embodiment has similar hardware and functional configurations to that according to the second embodiment illustrated in FIGS. 2 and 7. Therefore, in the description of the third embodiment, like elements and portions as FIG. 2 are denoted by like reference numerals.

According to the third embodiment, a history table is added. Information indicating capacities of the respective files written in the tape cartridge 130 is registered in the history table.

Figure 16:
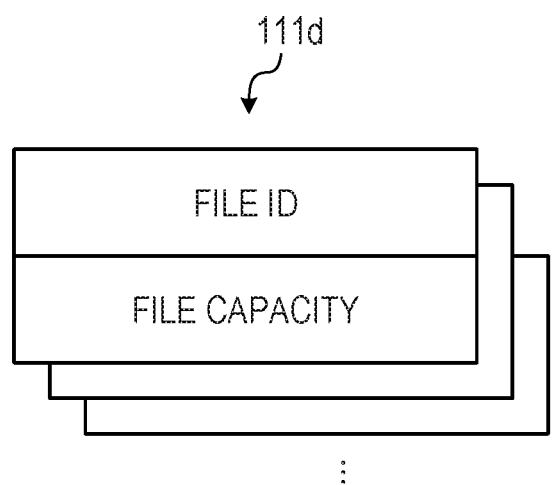
FIG. 16 is a diagram illustrating an example of a history table.

FIG. 16 is a diagram illustrating an example of a history table. A history table 111d is stored in the storage unit 111. The history table 111d has records for respective files written in the tape cartridge 130. Each of the records includes items of "File ID" and "File capacity".

Information identifying a file is registered in the "File ID" item. Information indicating a file capacity corresponding to the "File ID" item is registered in the "file capacity" item. The file capacity refers to an amount of data of the entire information (specifically, a data capacity from HDR1 to TM3) written in the magnetic tape for one file.

Figure 17:
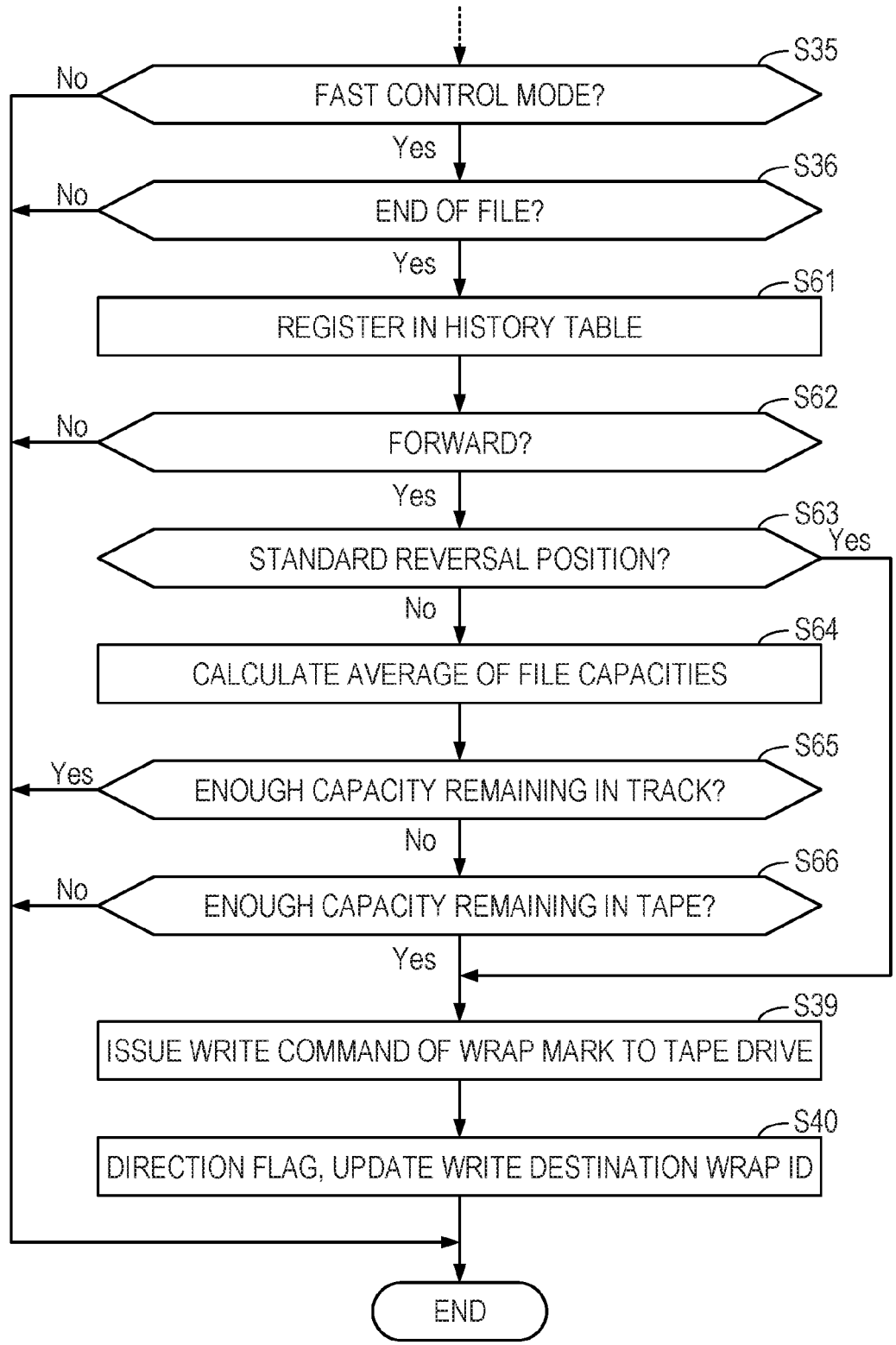
FIG. 17 is a flowchart illustrating exemplary write processing according to a third embodiment.

FIG. 17 is a flowchart illustrating exemplary write processing according to the third embodiment. In the third embodiment, the processing of S35 and after of FIG. 13 is modified as illustrated in FIG. 17. Hereinafter, the processing illustrated in FIG. 17 will be described. Only the processing different from FIG. 13 will be described below, and other processing will not be described.

Referring to FIG. 17, when it is determined at S35 that the current control mode is the fast control mode, and it is determined at S36 that the end of a file area is reached, S61 is performed.

(S61) The I/O control unit 113 registers the ID of a file written at S31 of FIG. 13 and the file capacity corresponding to the file in a new record of the history table 111d.

(S62) The I/O control unit 113 determines the current write direction in a similar manner as S37 of FIG. 13. When it is determined that the write direction is forward, the processing proceeds to S63. When it is determined that the write direction is backward, the processing is ended.

(S63) The I/O control unit 113 determines whether or not the write position reaches the standard reversal position, in a similar manner as S38 of FIG. 13. When it is determined that the write position reaches the standard reversal position, the processing proceeds to S39. When it is determined that the write position does not reach the standard reversal position, the processing proceeds to S64.

(S64) The I/O control unit 113 uses the file capacities registered in the history table 111d to calculate an average of the file capacities. The calculated average is used as an estimate of a file area corresponding to a file required to be written subsequently.

(S65) When the average calculated at S64 is assumed as a file capacity corresponding to the next file, the I/O control unit 113 determines whether or not the entire information corresponding to the next file may be written between the current write position and an EOT position. Specifically, when the average calculated at S64 is smaller than a residual capacity from the current write position to EOT, it is determined that the entire information may be written. When it is determined that the entire information may be written, the processing is ended. When it is determined that the entire information is unable to be written, the processing proceeds to S66.

The value calculated at S64 and compared with the residual capacity at S65 is not limited to the above-mentioned average. For example, this value may be a maximum of the file capacities registered in the history table 111d. Alternatively, for example, this value may be obtained by multiplying the average with a weighting coefficient based on a dispersion degree of the file capacities registered in the history table 111d.

(S66) The I/O control unit 113 determines whether or not, when the WRAP reversal occurs at the current write position, the residual capacity which may be written in a 36 track mode may fit in a remaining area of the magnetic tape from a position after the WRAP reversal. The residual capacity which may be written in a 36 track mode refers to a not-yet-written data capacity among all data capacities which may be written in the 36 track mode.

Specifically, the I/O control unit 113 adds all write capacities recorded in the "WRAP information" of the medium information table 111b. The I/O control unit 113 calculates the above-mentioned residual capacity by subtracting the calculated average from an upper limit of the data capacity which may be written in a 36 track mode. The I/O control unit 113 subtracts the calculated residual capacity from the entire residual capacity of the magnetic tape from the position after the WRAP reversal (that is, an identical position as the current write position in the next WRAP). When the result of the subtraction is 0 or more, it is determined that the residual capacity fits in the remaining area of the magnetic tape.

When it is determined that the residual capacity which may be written in a 36 track mode fits in the remaining area of the magnetic tape, the processing proceeds to S39. When it is determined that the residual capacity which may be written in a 36 track mode does not fit in the remaining area of the magnetic tape, the processing is ended.

In this way, in the case where it is predicted that information on the next file does not fit in an area between the standard reversal position and EOT when the next file is subsequently written in a forward WRAP, a WRAP mark is written at the current write position even before the standard reversal position. Accordingly, it is possible to reduce a probability that the WRAP reversal occurs in the middle of reading the written file, as compared to the second embodiment.

When the WRAP reversal is performed before the standard reversal position, the residual capacity which may be written in the magnetic tape is reduced. As a result, when data writing up to a limit which may be written in a 36 track mode is required, there is a possibility that the write data does not fit in the magnetic tape. For example, when only one forward WRAP is WRAP-reversed before the standard reversal position and other forward WRAPs are written up to the standard reversal position, the writing is unable to be performed up to a capacity which is limited in a 36 track mode. In such a case, a WRAP mark is not written at the current write position. Accordingly, it is possible to reliably write data in the magnetic tape up to the maximum capacity which is limited in a 36 track mode.

A 128 track mode and a 36 track mode have been described as the write mode of the magnetic tape in the second and third embodiments. However, there is no limitation in the writable data amount, and a write mode capable of writing data in the entire magnetic tape is not limited to the 128 track mode and other write modes may be used. Similarly, a write mode in which the writable data amount is limited to a data amount smaller than the total capacity of the magnetic tape is not limited to the 36 track mode and other write modes may be used.

The information processing of the first embodiment may be implemented by causing a processor used in the tape device 10 to execute a program. The information processing of the second and third embodiments may be implemented by causing the processor 110a to execute a program. The program may be recorded in a computer-readable recording medium.

For example, the program may be circulated by distributing a recording medium recorded therein with the program. Individual programs implementing the functions corresponding to the mount control unit 112 and the I/O control unit 113 may be separately distributed. The functions of the mount control unit 112 and the I/O control unit 113 may be implemented by separate computers. Each computer may store (install) a program recorded in a recording medium in the RAM 110b or the flash memory 110c, and read the program from the memory to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A tape device, comprising:
   a tape drive configured to
      write plural data units in a magnetic tape formed with plural tracks, each of the plural tracks having a write direction which is a forward direction or a backward direction;
   a storage unit configured to
      store therein information indicating a reversal position in the magnetic tape, the reversal position indicating a position at which the write direction is to be reversed in the magnetic tape; and
   a processor configured to
      instruct the tape drive to start writing of a first data unit of the plural data units in the magnetic tape,
      control the tape drive to continue the writing of the first data unit past the reversal position up to an end of the first data unit when a first write area crosses over the reversal position, the first write area being an area of a first track of the plural tracks, the first data unit being written in the first write area, the first track having the forward direction, and
      control the tape drive to change a write destination from the first track to a second track of the plural tracks after the first data unit is written in the first write area and to reverse the write direction, the write destination being a track in which data is written.

2. The tape device according to claim 1, wherein
   the processor configured to
      instruct the tape drive to write first control information at a position subsequent to the first write area in the first track to control the tape drive to reverse the write direction, the first control information indicating reversal of the write direction.

3. The tape device according to claim 1, wherein
   the reversal position is determined on a basis of a predetermined threshold and a total number of the plural tracks, the predetermined threshold being smaller than a total capacity of the magnetic tape.

4. The tape device according to claim 1, wherein
   the processor configured to
      calculate, after a second data unit of the plural data units is written in the first track, a predictive value of an amount of the first data unit on basis of a write history, the second data unit being written immediately before the first data unit, the write history including information on amounts of respective third data units of the plural data units, the third data units being already written in the magnetic tape,
      determine, on basis of the predictive value, whether the first data unit fits in the first track, and
      control, when it is determined that the first data unit does not fit in the first track, the tape drive to reverse the write direction before the first data unit is written.

5. The tape device according to claim 4, wherein
   the processor configured to
      calculate a first amount by subtracting a total of the amounts of the respective third data units from a predetermined threshold smaller than a total capacity of the magnetic tape, determine whether data having the first amount fits in a remaining area of the magnetic tape, and control, when it is determined that the data having the first amount fits in the remaining area and that the first data unit does not fit in the first track, the tape drive to reverse the write direction before the first data unit is written.

6. A controller, comprising:

a storage unit configured to store therein information indicating a reversal position in a magnetic tape in which plural data units are written, the magnetic tape being formed with plural tracks, each of the plural tracks having a write direction which is a forward direction or a backward direction, the reversal position indicating a position at which the write direction is to be reversed in the magnetic tape; and a processor configured to instruct a tape drive to start writing of a first data unit of the plural data units in the magnetic tape, control the tape drive to continue the writing of the first data unit past the reversal position up to an end of the first data unit when a first write area crosses over the reversal position, the first write area being an area of a first track of the plural tracks, the first data unit being written in the first write area, the first track having the forward direction, and control the tape drive to change a write destination from the first track to a second track of the plural tracks after the first data unit is written in the first write area and to reverse the write direction, the write destination being a track in which data is written.

7. A computer-readable recording medium having stored therein a program that causes a computer to execute a process, the process comprising:

instructing a tape drive to start writing of a first data unit of plural data units in a magnetic tape in which the plural data units are written, the magnetic tape being formed with plural tracks, each of the plural tracks having a write direction which is a forward direction or a backward direction;

controlling the tape drive to, when a first write area crosses over a reversal position in the magnet tape, continue the writing of the first data unit past the reversal position up to an end of the first data unit, the first write area being an area of a first track of the plural tracks, the first data unit being written in the first write area, the first track having the forward direction, the reversal position indicating a position at which the write direction is to be reversed in the magnetic tape; and controlling the tape drive to change a write destination from the first track to a second track of the plural tracks after the first data unit is written in the first write area and to reverse the write direction, the write destination being a track in which data is written.

\* \* \* \* \*